United States Patent
Ishigaki

(10) Patent No.: US 11,009,393 B2
(45) Date of Patent: May 18, 2021

(54) SPECTROSCOPIC ANALYSIS CONTROL DEVICE, SPECTROSCOPIC ANALYSIS DEVICE, SPECTROSCOPIC ANALYSIS CONTROL METHOD, AND SPECTROSCOPIC ANALYSIS CONTROL PROGRAM

(71) Applicant: Shimadzu Corporation, Kyoto (JP)

(72) Inventor: Masaki Ishigaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/976,444

(22) PCT Filed: Mar. 1, 2018

(86) PCT No.: PCT/JP2018/007760
§ 371 (c)(1),
(2) Date: Aug. 27, 2020

(87) PCT Pub. No.: WO2019/167224
PCT Pub. Date: Sep. 6, 2019

(65) Prior Publication Data
US 2021/0003447 A1 Jan. 7, 2021

(51) Int. Cl.
*G01J 3/00* (2006.01)
*G01J 3/02* (2006.01)
*G01J 3/42* (2006.01)

(52) U.S. Cl.
CPC ............ *G01J 3/027* (2013.01); *G01J 3/0264* (2013.01); *G01J 3/42* (2013.01)

(58) Field of Classification Search
CPC .. G01N 21/274; G01J 2003/2866; G01J 3/02; G01J 3/42; G01J 3/28

(Continued)

(56) References Cited

U.S. PATENT DOCUMENTS

| 8,831,330 B2 * | 9/2014 | Fujikawa | G06T 7/0004 |
| | | | 382/141 |
| 2012/0299930 A1 | 11/2012 | Goto | |
| 2015/0026632 A1 * | 1/2015 | Wakabayashi | G06F 3/04817 |
| | | | 715/776 |

FOREIGN PATENT DOCUMENTS

| JP | 08-233729 A | 9/1996 |
| JP | 11-118708 A | 4/1999 |

(Continued)

OTHER PUBLICATIONS

International Search Report for PCT Patent Application No. PCT/JP2018/007760 dated May 22, 2018.

(Continued)

*Primary Examiner* — Md M Rahman
(74) *Attorney, Agent, or Firm* — Muir Patent Law, PLLC

(57) ABSTRACT

A display unit is controlled so that a plurality of parameter setting screens respectively corresponding to a plurality of steps sequentially executed in a predetermined order in quantitation is sequentially displayed and a plurality of step indexes respectively corresponding to the plurality of steps is displayed. In a plurality of parameter setting screens, inputting of a plurality of parameters respectively corresponding to the plurality of steps is received. Each time inputting of parameters in each parameter setting screen is completed, the received parameters are set in an unchangeable manner. The display unit is controlled so that each time parameters are set in one parameter setting screen, the next parameter setting screen is displayed, and the step index corresponding to the displayed parameter setting screen which is being displayed among the plurality of step indexes is displayed in such a manner as to be distinguishable from the other step indexes. A spectrophotometer is controlled based on the set parameters. The sample is quantified by a (Continued)

quantitative execution unit based on the set plurality of parameters.

11 Claims, 14 Drawing Sheets

(58) Field of Classification Search
USPC .......................................................... 356/319
See application file for complete search history.

(56) References Cited

FOREIGN PATENT DOCUMENTS

| JP | 2001-116688 A | 4/2001 |
|----|---------------|--------|
| JP | 2012-243183 A | 12/2012 |
| JP | 2017-187413 A | 10/2017 |

OTHER PUBLICATIONS

Written Opinion of the International Searching Authority for PCT Application No. PCT/JP2018/007760, dated May 22, 2018, submitted with a machine translation.

* cited by examiner

SPECTROSCOPIC ANALYSIS CONTROL DEVICE, SPECTROSCOPIC ANALYSIS DEVICE, SPECTROSCOPIC ANALYSIS CONTROL METHOD, AND SPECTROSCOPIC ANALYSIS CONTROL PROGRAM

TECHNICAL FIELD

The present invention relates to a spectroscopic analysis control device, a spectroscopic analysis device, a spectroscopic analysis control method, and a spectroscopic analysis control program for analyzing a sample.

BACKGROUND OF THE INVENTION

In a spectroscopic analysis device, light absorption quantities, light emission amounts, etc., of a plurality of standard samples each having a known concentration (hereinafter, a light absorption quantity will be described as an example) is measured. With this, a calibration curve showing the correspondence relation between the light absorption quantity and the concentration of a plurality of standard samples is generated. Thereafter, a light absorption quantity of an unknown sample whose concentration is unknown is measured. Based on the measured light absorption quantity of the unknown sample and the generated calibration curve, the concentration of the unknown sample is quantified. When performing the above-described measurement, a user sets appropriate measurement conditions to a spectroscopic analysis device.

Patent Document 1 describes a spectrophotometer in which measurement parameters (measurement conditions) can be input selectively between an all parameter mode and a partial parameter mode. The all parameter mode is selected by a user who is sufficiently familiar with measurement parameters and receives inputting of a number measurement parameters ("unit", "wavelength", "photometric value range", "slit-width" and "cumulative number"). The partial parameter mode is selected by a user who is not fully familiar with measurement parameters and receives inputting of only the required minimum basic measurement parameters ("unit" and "wavelength").

Patent Document 1: Japanese Unexamined Patent Application Publication No. H8-233729

SUMMARY OF THE INVENTION

Problems to be Solved by the Invention

In recent years, a spectroscopic analysis device has been developed in which not only measurement conditions but also a concentration of a standard sample, a light absorption quantity of a standard sample, a light absorption quantity of an unknown sample, etc., are sequentially input, thereby automatically generating a calibration curve and quantifying the concentration of the unknown sample. However, in such a spectroscopic analysis device, since there are a wide variety of setting items, it is not easy for an unskilled user to understand which setting items must be input in what order. Further, even a skilled user may not know to what stage the inputting of the setting items has been advanced.

In particular, in a stand-alone spectroscopic analysis device, a spectroscopic analysis device is equipped with a small operation panel. In this case, since only a small number of setting items, i.e., about 1 to 2 setting items, can be simultaneously displayed on the operation panel, the user needs to switch the display screens of the operation panel each time in order to input a number of setting items. Therefore, the above-described problem becomes more obvious. Further, when the input stage of the setting items becomes unknown, the user must switch the display screens many times to confirm it. Therefore, a spectroscopic analysis device with improved operability has been desired.

It is an object of the present invention to provide a spectroscopic analysis control device, a spectroscopic analysis device, a spectroscopic analysis control method, and a spectroscopic analysis control program with improved operability.

Means for Solving the Problem (1) A spectroscopic analysis control device according to one aspect of the present invention is a spectroscopic analysis control device connected to a spectrophotometer for performing spectroscopic measurement of a sample and configured to quantify the sample based on parameters input from a display unit. The spectroscopic analysis control device includes:

a display control unit configured to sequentially display a plurality of parameter setting screens respectively corresponding to a plurality of steps successively executed in a predetermined order in a quantitation on the display unit and display a plurality of step indexes respectively corresponding to the plurality of steps on the display unit;

a parameter reception unit configured to receive inputting of a plurality of parameters respectively corresponding to the plurality of steps on the plurality of parameter setting screens;

a parameter setting unit configured to set the received parameters in an unchangeable manner each time a reception of inputting of the parameters in each parameter setting screen is completed;

an analysis control unit configured to control the spectrophotometer based on the plurality of parameters set in the parameter setting unit; and a quantitative execution unit configured to quantify the sample based on the plurality of parameters set in the parameter setting unit, wherein the display control unit controls the display unit so that a subsequent parameter setting screen is displayed each time parameters are set by the parameter setting unit in one parameter setting screen and controls the display unit so that a step index corresponding to a parameter setting screen which is being displayed on the display unit among the plurality of step indexes is displayed in such a manner as to be distinguishable from the other step indexes.

In this spectroscopic analysis control device, the display unit is controlled so that a plurality of parameter setting screens respectively corresponding to a plurality of steps sequentially executed in a predetermined order in the quantitation is sequentially displayed and a plurality of step indexes respectively corresponding to a plurality of steps is displayed. In the plurality of parameter setting screens, inputting of a plurality of parameters respectively corresponding to a plurality of steps is received. Each time inputting of parameters in each parameter setting screen is completed, the received parameters are set in an unchangeable manner. Here, the display unit is controlled so that, each time parameters are set in one parameter setting screen, the subsequent parameter setting screen is displayed and the step index corresponding to the displayed parameter setting screen between the plurality of step indexes is displayed in such a manner as to be distinguishable from the other step indexes. The spectrophotometer is controlled based on the set parameters. Further, a sample is quantitated based on the plurality of set parameters.

According to this configuration, the inputting of parameters in each step is received from the parameter setting screen corresponding to the step displayed on the display unit. When the previously set parameters are changed, parameters corresponding to the subsequent step may become inappropriate due to the change of parameters. Therefore, each time the reception of inputting of parameters corresponding to one step is completed, the received parameters are set to be unchangeable, and a parameter setting screen corresponding to the subsequent step is displayed in the display unit. This can prevent parameters corresponding to the subsequent step from becoming inappropriate due to the change of parameters corresponding to the prior step. Further, the user can easily input predetermined parameters in a predetermined order without mistaking the order of inputting parameters.

Further, in the display unit, a step index corresponding to the current step is displayed in such a manner as to be distinguishable from the other step indexes. Therefore, the user can easily confirm that the parameters which are currently being input correspond to which step in the entire steps. Thus, the user is not required to switch the parameter setting screen displays to confirm the current step. As a result, the operability of the spectroscopic analysis control device can be improved.

(2) It may be configured such that the display control unit controls the display unit to further distinguishably display a step index corresponding to a step in which parameters have been set and a step index corresponding to a step in which parameters have not been set In this case, by visually recognizing a plurality of step indexes, the user can easily distinguish between the step in which parameters have been set and the step in which no parameters have been set.

(3) It may be configured such that the display control unit controls the display unit so that the step index corresponding to the step in which parameters have been set and the step index corresponding to the step in which parameters have not been set are displayed in a different shape.

In this case, by visually recognizing the shapes of the plurality of step indexes, the user can more easily distinguish the step in which parameters have been set from the step in which no parameters have been set.

(4) It may be configured such that the spectroscopic analysis control device further includes:

a screen switching unit configured to receive an instruction to switch displays between one or more parameter setting screens respectively corresponding to the one or more steps and a parameter setting screen subsequent to the one or more parameter setting screens after parameters corresponding to one or more steps have been set, wherein when an instruction to display any parameter setting screen is received by the screen switching unit, the display control unit controls the display unit to display the parameter setting screen.

In this case, the user can confirm the preset parameters by switching the parameter setting screen displays. Further, the display can also be returned to the parameter setting screen corresponding to the current step.

(5) It may be configured such that the screen switching unit receives an instruction to display a parameter setting screen corresponding to the operated step index when any one of the plurality of step indexes displayed on the display unit is operated.

In this case, the user can easily switch the parameter setting screen displays by operating the step index corresponding to the step in which parameters have been set or the current step.

(6) It may be configured such that the spectroscopic analysis control device further includes a resetting unit configured to receive an instruction to reset the set parameters, wherein the parameter setting unit cancels setting of parameters corresponding to all steps after a step in which resetting of parameters is instructed when an instruction to reset parameters corresponding to any one of steps is received, and wherein the display control unit controls the display unit to display a parameter setting screen corresponding to the step in which resetting of parameters is instructed.

According to this configuration, when an instruction to reset previously set parameters is received, the setting of parameters corresponding to all steps after the step corresponding to the parameters is canceled. Therefore, it is possible to prevent parameters corresponding to the subsequent steps from becoming inappropriate due to the change of the preset parameters. Further, it is possible to sequentially reset parameters of all the steps after the step corresponding to the canceled parameters.

(7) It may be configured such that the parameter setting unit sets, as the plurality of parameters, measurement conditions of spectroscopic measurement in the spectrophotometer, parameters for generating a calibration curve indicating a correspondence relation between a concentration in a standard sample which is a sample having a known concentration and a spectral characteristic value, and a spectral characteristic value of an unknown sample which is a sample having an unknown concentration, in this order, wherein the analysis control unit controls the spectrophotometer to measure spectral characteristic values of a standard sample and an unknown sample based on the measurement conditions set to the parameter setting unit, and wherein the quantitative execution unit quantifies a concentration of the unknown sample based on parameters for generating the calibration curve set in the parameter setting unit and the spectral characteristic value in the unknown sample.

In this case, measurement conditions are received from a predetermined parameter setting screen and set. The spectrophotometer is controlled based on the set measurement conditions. Based on the known sample measurement by the spectrophotometer, parameters for generating a calibration curve are received from the parameter setting screen and set. Further, based on the unknown sample measurement by the spectrophotometer, the spectral characteristic values of the unknown sample are also received and set from another parameter setting screen. Based on parameters for generating a set calibration curve and spectral characteristic values of the unknown sample, the concentration of the unknown sample can be quantified.

(8) It may be configured such that the parameter for generating the calibration curve includes the concentration of the standard sample, the spectral characteristic values of the standard sample, and an order of the calibration curve.

In this case, the calibration curve can be easily generated based on the concentrations of standard samples, the spectral characteristic values of standard samples, and the order of the calibration curve.

(9) A spectroscopic analysis device according to another aspect of the present invention includes:

a spectrophotometer configured to perform spectroscopic measurement of a sample;

a display unit configured to receive inputting of parameters; and the spectroscopic analysis control device as recited in any one of claims 1 to 8 for controlling operations of the spectrophotometer and the display unit.

In this spectroscopic device, a plurality of parameter setting screens respectively corresponding to a plurality of steps to be sequentially executed in a predetermined order in a quantitation is displayed on the display unit, and a plurality of step indexes respectively corresponding to a plurality of steps is displayed on the display unit. In the plurality of parameter setting screens, inputting of a plurality of parameters respectively corresponding to a plurality of steps is received. Each time the reception of inputting of parameters on each parameter setting screen is completed, the received parameters are set in an unchangeable manner. Here, each time parameters are set on one parameter setting screen, the subsequent parameter setting screen is displayed on the display unit, and step indexes corresponding to the displayed parameter setting screen among the plurality of step indexes is displayed in such a manner as to be distinguishable from the other step indexes. The spectrophotometer is controlled based on the set parameters. Further, the sample is quantitated based on the plurality of set parameters.

In this case, it is possible to prevent parameters corresponding to the subsequent step from becoming inappropriate due to the change of parameters corresponding to the previous step. Further, the user can easily input predetermined parameters in a predetermined order without mistaking the order of inputting of parameters. Further, the user can easily confirm that the currently inputting parameters are parameters corresponding to which step in the entire steps by visually recognizing the plurality of step indexes. Therefore, the user is not required to switch the parameter setting screen displays to confirm the current step. As a result, the operability of the spectroscopic analysis device can be improved.

(10) A spectroscopic analysis control method according to another aspect of the present invention is a spectroscopic analysis control method of a spectroscopic analysis control device connected to a spectrophotometer for performing spectroscopic measurement of a sample and configured to quantify the sample based on parameters input from a display unit, the spectroscopic analysis control method includes:

a step for sequentially displaying a plurality of parameter setting screens respectively corresponding to a plurality of steps sequentially executed in a predetermined order in a quantitation on the display unit and displaying a plurality of step indexes respectively corresponding to the plurality of steps on the display unit;

a step for receiving inputting of a plurality of parameters respectively corresponding to the plurality of steps on the plurality of parameter setting screens;

a step for setting the received parameters in an unchangeable manner each time a reception of inputting of parameters in each parameter setting screen is completed;

a step for controlling the spectrophotometer based on the set parameters; and a step for quantifying the sample based on the plurality of set parameters, wherein the step for sequentially displaying the plurality of parameter setting screens includes displaying a subsequent parameter setting screen on the display unit each time parameters are set in one display unit and displaying a step index corresponding to a parameter setting screen which is being displayed on the display unit among the plurality of step indexes on the display unit in such a manner as to be distinguishable from the other step indexes.

According to the spectroscopic analysis control method, it is possible to prevent the parameters corresponding to the subsequent step from becoming inappropriate due to the change of the parameters corresponding to the previous step. Further, the user can easily input predetermined parameters in a predetermined order without mistaking the order of inputting of parameters. Further, the user can easily confirm the currently inputting parameters are parameters corresponding to which step in the entire steps by visually recognizing a plurality of step indexes. Thus, the user is not required to switch the parameter setting screen displays to confirm the current step. As a result, the operability of the spectroscopic analysis control device can be improved.

(11) A spectroscopic analysis control program according to another aspect of the present invention is a spectroscopic analysis control program of a spectroscopic analysis control device connected to a spectrophotometer for performing spectroscopic measurement of a sample and configured to quantify the sample based on parameters input from a display unit. The spectroscopic analysis control program makes a processing unit execute:

processing of sequentially displaying a plurality of parameter setting screens respectively corresponding to a plurality of steps sequentially executed in a predetermined order in quantitation on the display unit and displaying a plurality of step indexes respectively corresponding to the plurality of steps on the display unit;

processing of receiving inputting of a plurality of parameters respectively corresponding to the plurality of steps in the plurality of parameter setting screens;

processing of setting the received parameters in an unchangeable manner each time a reception of inputting of parameters in each parameter setting screen is completed;

processing of controlling the spectrophotometer based on the set parameters; and processing of quantifying the sample based on the plurality of set parameters, wherein the processing of sequentially displaying a plurality of parameter setting screens includes displaying a subsequent parameter setting screen on the display unit each time parameters are set in parameter setting screen and displaying a step index corresponding to a parameter setting screen which is being displayed on the display unit among the plurality of step indexes on the display unit in such a manner as to be distinguishable from the other step indexes According to the spectroscopic analysis control program, it is possible to prevent the parameters corresponding to the subsequent step from becoming inappropriate due to the change of parameters corresponding to the previous step. Further, the user can easily input predetermined parameters in a predetermined order without mistaking the order of inputting of parameters. Further, the user can easily confirm the currently inputting parameters are parameters corresponding to which step in all steps by visually recognizing a plurality of step indexes. Therefore, the user is not required to switch the parameter setting screen displays to confirm the current step. As a result, the operability of the spectroscopic analysis control device can be improved.

Effects of the Invention

According to the present invention, the operability of the spectroscopic analysis control device can be improved.

EMBODIMENTS FOR CARRYING OUT THE INVENTION

Hereinafter, a spectroscopic analysis control device according to an embodiment of the present invention, a spectroscopic analysis device equipped with the same, a spectroscopic analysis control method, and a spectroscopic analysis control program will be described in detail with reference to the attached drawings.

(1) Configuration of Spectroscopic Analysis Device

Figure 1:
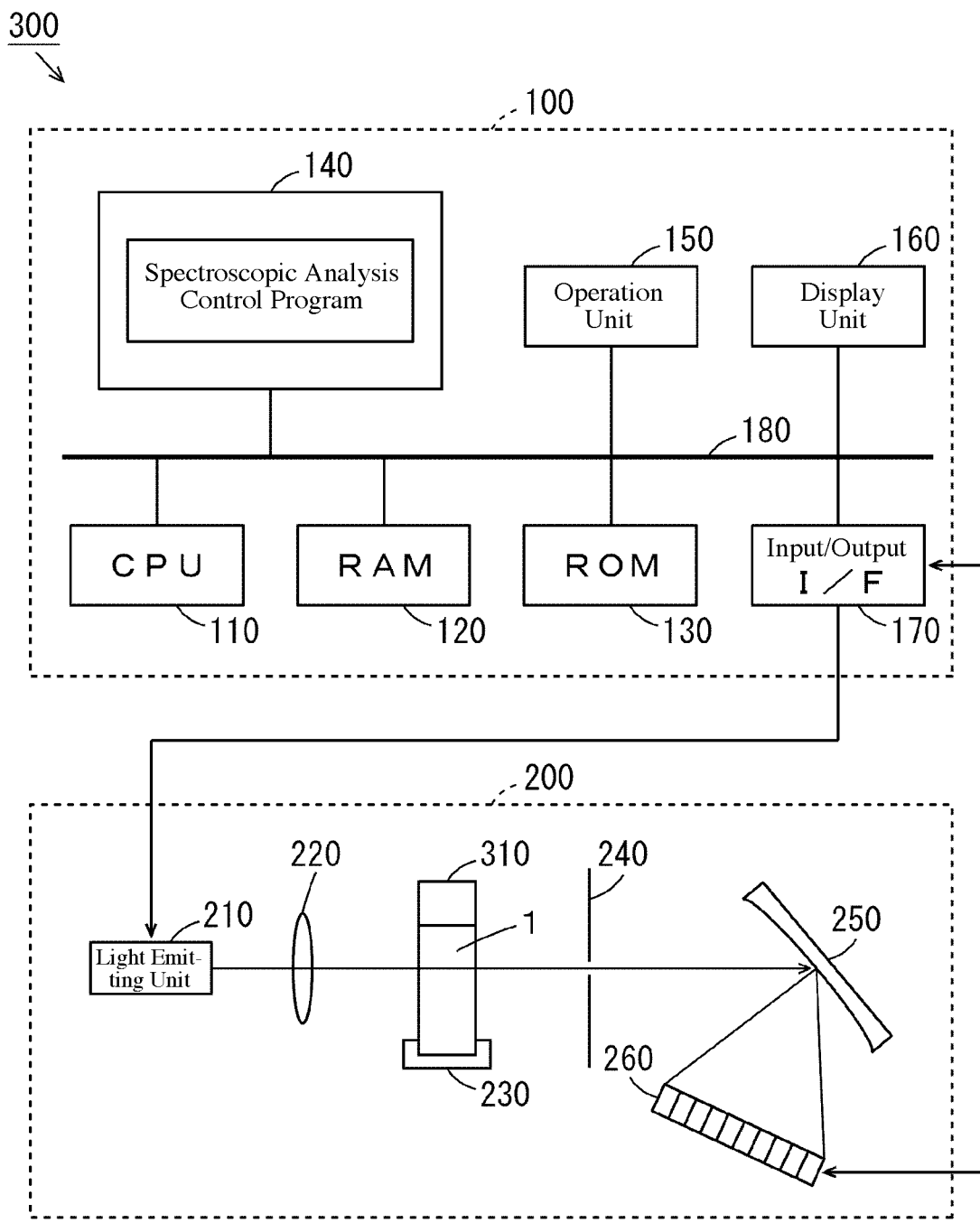
FIG. 1 is a diagram showing a configuration of a spectroscopic analysis device according to an embodiment of the present invention.

FIG. 1 is a diagram showing a configuration of a spectroscopic analysis device according to an embodiment of the present invention. As shown in FIG. 1, the spectroscopic analysis device 300 includes a spectroscopic analysis control device 100 and a spectrophotometer 200 for performing spectroscopic measurement. In FIG. 1, the hardware configuration of the spectroscopic analysis device 300 is mainly shown.

The spectroscopic analysis control device 100 includes a CPU (central processing unit) 110, a RAM (random access memory) 120, a ROM (read-only memory) 130, a storage device 140, an operation unit 150, a display unit 160, and an input/output I/F (interface) 170. The CPU 110, the RAM 120, the ROM 130, the storage device 140, the operation unit 150, the display unit 160, and the input/output I/F 170 are connected to a bus 180.

The RAM 120 is used as a workspace of the CPU 110. A system program is stored in the ROM 130. The storage device 140 includes a storage medium, such as, e.g., a hard disk and a solid-state memory, and stores a spectroscopic analysis control program. The CPU 110 executes a spectroscopic analysis control program stored in the storage device 140 on the RAM 120, thereby performing the spectroscopic analysis control processing which will be described later.

The operation unit 150 includes an input device, such as, e.g., a keyboard and a mouse. The display unit 160 includes a display device such as a liquid crystal display device. The operation unit 150 and the display unit 160 may be configured by a touch panel. The display unit 160 sequentially displays a parameter setting screen for receiving a plurality of parameters required to quantify a concentration of a sample. The user can specify a plurality of parameters on the parameter setting screen of the display unit 160 by using the operation unit 150. The input/output I/F 170 is connected to the spectrophotometer 200.

The spectrophotometer 200 includes a light emitting unit 210, a lens 220, a sample stage 230, a spatial filter 240, a spectroscopic element 250, and a light receiving unit 260. The light emitting unit 210 includes a plurality of light sources, such as, e.g., a deuterium lamp and a halogen lamp, and emits light having various wavelengths based on the control by the spectroscopic analysis control device 100.

A sample 1 is attached to the sample stage 230. Here, the spectroscopic analysis device 300 includes a sample cell 310 as an accessory device, and in cases where the sample 1 is a liquid or a gas, the sample 1 is attached to the sample stage 230 in a state in which the sample is injected into the sample cell 310. On the other hand, in cases where the sample 1 is a solid, the sample 1 is directly attached to the sample stage 230. In the following description, the sample 1 in which the concentration is known is referred to as a standard sample, and the sample 1 in which the concentration is unknown is referred to as an unknown sample.

The light emitted from the light emitting unit 210 is condensed by the lens 220 and irradiated onto the sample 1 attached to the sample stage 230. The light irradiated to the sample stage 230 is guided through the opening (pinhole) of the spatial filter 240 to the spectroscopic element 250. The spectroscopic element 250 is, for example, a reflective concave diffraction grating. The light guided to the spectroscopic element 250 is spatially separated for each wavelength, and is received by the light receiving unit 260.

The light receiving unit 260 is a line sensor in which a plurality of light receiving elements is arranged one-dimensionally and a plurality of light separated for each wavelength is respectively received by a plurality of light receiving elements based on the control by the spectroscopic analysis control device 100. Further, the light receiving unit 260 outputs an electric signal (hereinafter referred to as "light receiving signal") corresponding to the amount of light received in each pixel to the spectroscopic analysis control device 100.

Thereby, the spectral characteristic values, such as a light absorption quantity and a light emission amount, of the sample 1 is measured by the spectroscopic analysis control device 100. Further, based on a plurality of types of parameters including a spectral characteristic value of a measured unknown sample, the concentration of the unknown sample is quantified by the spectroscopic analysis control device 100. Here, a plurality of types (5 types in this example) of parameters is received in a predetermined order in each of a plurality of parameter setting screens displayed on the display unit 160.

Specifically, in the first step, measurement conditions are received in the condition setting screen. In the second step, accessory device information is received in the accessory device screen. In the third step, standard sample information is received at the standard sample screen. In the fourth step, calibration curve information is received in the calibration curve screen. In the fifth step, unknown sample information is received at the unknown sample screen. Hereinafter, each parameter setting screen and the type of a parameter are described below.

(2) Parameter Setting Screen (a) Condition Setting Screen

Figure 2:
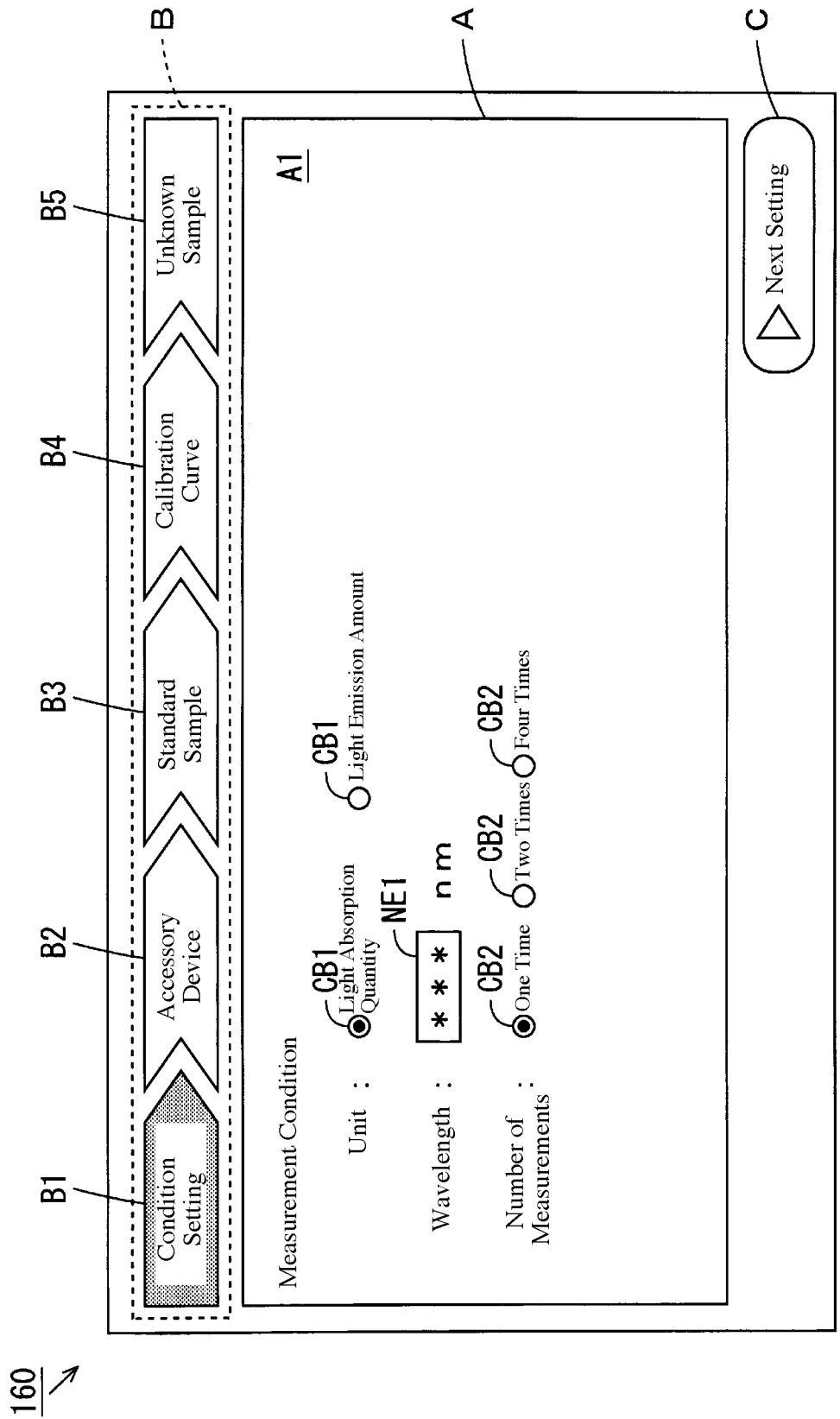
FIG. 2 is a diagram showing an example of a condition setting screen.

FIG. 2 is a diagram showing an example of a condition setting screen. As shown in FIG. 2, a rectangular setting screen display area A is provided at the center of the display unit 160. After the start of the spectroscopic analysis control processing, a condition setting screen A1 is displayed in the setting screen display area A as a first parameter setting screen in the first step. In the case of FIG. 2, measurement conditions showing "unit", "wavelength", and "number of measurement" are received as parameters by the condition setting screen A1.

The "Unit" indicates whether the spectral characteristic value is a light absorption quantity or a light emission amount. The "unit" is received by checking any one of a plurality of check boxes CB1 displayed on the condition setting screen A1 so as to correspond to the type of the "unit". The "Wavelength" indicates the wavelength of light emitted from the light emitting unit 210 of FIG. 1. The "wavelength" is received by inputting a numerical value in the numeric input field NE1 displayed on the condition setting screen A1 so as to correspond to the type of the "wavelength". The "number of measurement" denotes the number of executing the spectrophotometry by the spectrophotometer 200. The "number of measurement" is received by checking any one of a plurality of check boxes CB2 displayed on the condition setting screen A1 so as to correspond to the type of the "number of measurement".

At the upper portion of the display screen of the display unit 160, a strip-shaped step index display area B is provided so as to extend in the lateral direction. In the step index display area B, regardless of the parameter setting screen displayed on the setting screen display area A, a plurality of step indexes B1 to B5 respectively corresponding to a plurality of steps is constantly displayed.

Of the plurality of step indexes B1 to B5, the step index corresponding to the parameter setting screen displayed in the setting screen display area A is displayed so as to be distinguishable from the other step indexes. In the example of FIG. 2, the step index B1 corresponding to the condition setting screen A1 which is being displayed on the setting screen display area A is displayed in a color different from the colors of the other step indexes B2 to B5.

Further, the step index corresponding to the step in which parameters have been set and the step index corresponding to the step in which parameters have not been set are displayed in such a manner as to be further distinguishable. Specifically, the step index corresponding to the step in which parameters have been set and the step index corresponding to the step in which no parameters have been set are displayed in a different shape. In the example of FIG. 2, no parameters are set in any step. Therefore, all of the step indexes B1 to B5 are displayed in a same shape (e.g., a ribbon-like shape, such as, e.g., a pentagonal shape and a hexagonal shape).

A setting button C is displayed at the lower portion of the display unit 160. When the setting button C is operated in a state in which measurement conditions are received in the condition setting screen A1, the received measurement conditions are set in an unchangeable manner. In place of the condition setting screen A1, an accessory device screen is displayed on the setting screen display area A as a second parameter setting screen. Further, the display mode of the plurality of step indexes B1 to B5 changes. Based on the set measurement conditions, the operation of the spectrophotometer 200 of FIG. 1 is controlled.

(b) Accessory Device Screen

Figure 3:
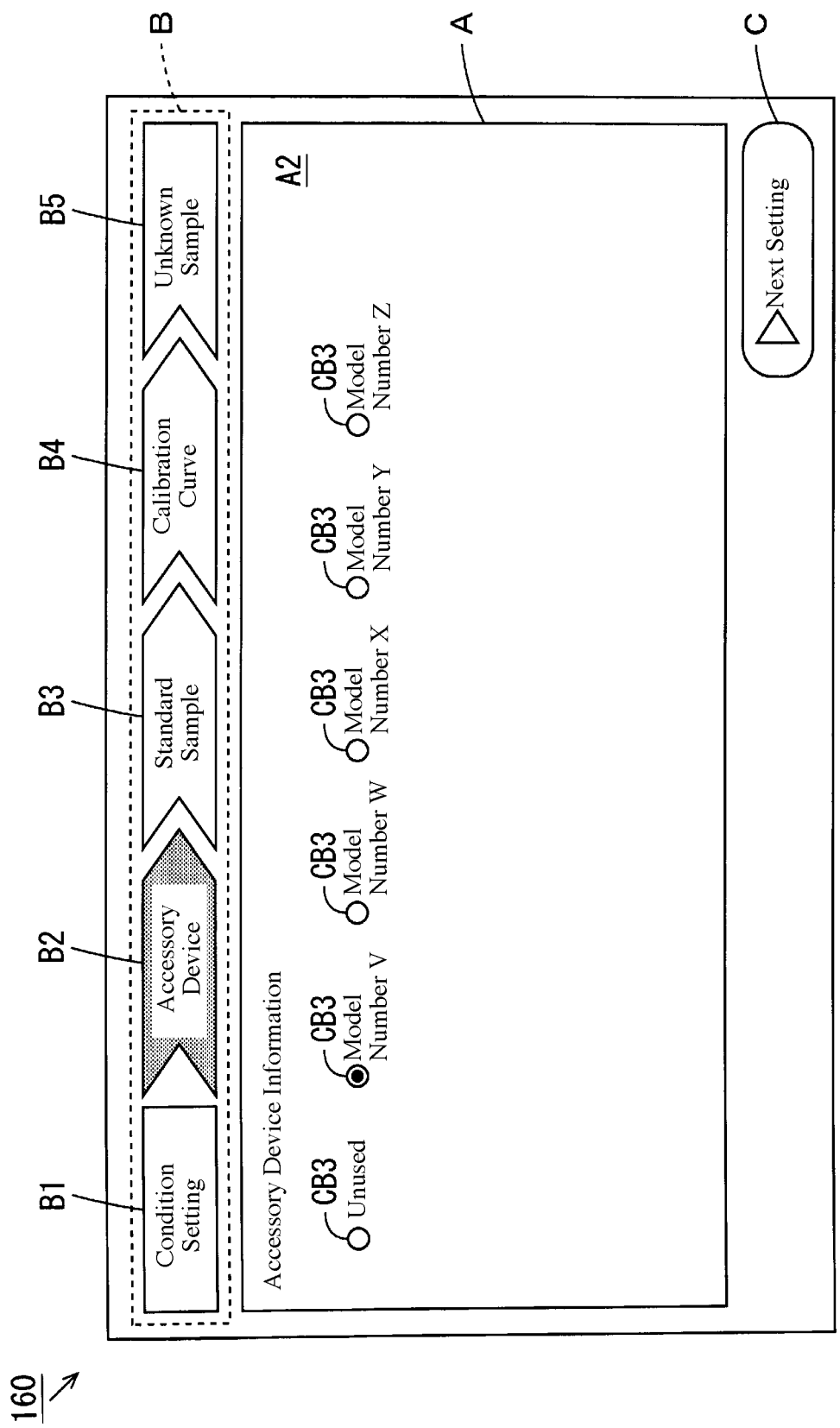
FIG. 3 is a diagram showing an example of an accessory device screen.

FIG. 3 is a diagram showing an example of an accessory device screen. At this time, parameters in the first step have been set, and parameters in the second to fifth steps have not been set. Therefore, as shown in FIG. 3, the step index B1 corresponding to the first step is displayed in a rectangular shape, and the step indexes B2 to B5 corresponding to the second to fifth steps are each displayed in a ribbon-like shape. The step index B2 corresponding to the accessory device screen A2 displayed on the setting screen display area A is displayed in a color different from the colors of the other step indexes B1, B3 to B5.

In the accessory device screen A2, the information (accessory device information) about the accessory device provided to the spectroscopic analysis device 300 of FIG. 1 is received as parameters. The accessory device is, for example, a sample cell 310 of FIG. 1. The accessory device information includes, for example, the shape and the dimensions of the accessory device. The accessory device information includes not using the accessory device. Note that since the accessory device information can be specified by the model number of the accessory device, in the example of FIG. 3, the "Model Number V" to "Model Number Z" of the accessory device are displayed as the accessory device information in the accessory device screen A2. The accessory device information is received by checking any one of the plurality of checkboxes CB3 displayed in the accessory device screen A2 so as to correspond to the type of the accessory device information.

When the setting button C is operated in a state in which the accessory device information is received in the accessory device screen A2, the received accessory device information is set in an unchangeable manner. In place of the accessory device screen A2, a standard sample screen is displayed on the setting screen display area A as a third parameter setting screen, and the display mode of the plurality of step indexes B1 to B5 changes.

(c) Standard Sample Screen

Figure 4:
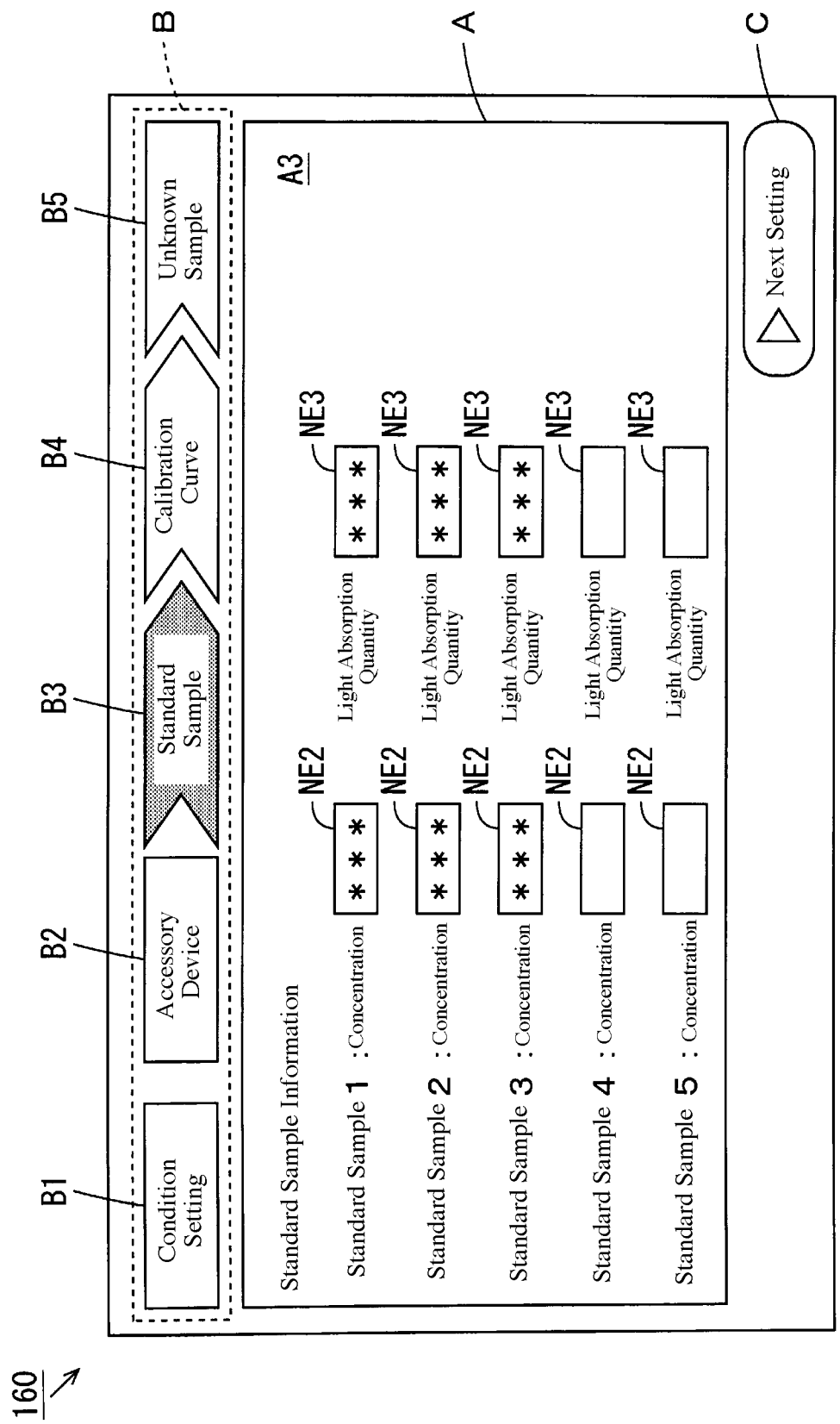
FIG. 4 is a diagram showing an example of a standard sample screen.

FIG. 4 is a diagram showing an example of a standard sample screen. At this time, parameters in the first and second steps have been set, and parameters in the third to fifth steps have not been set. Therefore, as shown in FIG. 4, the step indexes B1 and B2 respectively corresponding to the first and second steps are each displayed in a rectangular shape, and the step indexes B3 to B5 respectively corresponding to the third to fifth steps are each displayed in a ribbon-like shape. The step index B3 corresponding to the standard sample screen A3 which is being displayed on the setting screen display area A is displayed in a color different from the colors of the other step indexes B1, B2, B4, and B5.

In the standard sample screen A3, standard sample information on each of a plurality of standard samples is received as parameters. The standard sample information includes a set of the concentration and the spectral characteristic value. In the example of FIG. 4, the "standard sample 1" to the "standard sample 5" are displayed on the standard sample screen A3 as a plurality of standard samples. Each standard sample information is received by inputting a concentration and a spectral characteristic value in each of the numeric input fields NE2 and NE3 displayed on the standard sample screen A3 so as to correspond to the standard sample information.

Here, the spectral characteristic value of a standard sample measured by the spectrophotometer 200 of FIG. 1 based on the measurement condition and the accessory device information respectively set in the first and second steps will be input into the numeric input field NE3. In the example of FIG. 4, the spectral characteristic value is the "light absorption quantity". For the "standard sample 1" to the "standard sample 3", the "concentration" and the "light absorption quantity" have been input to the numeric input fields NE2 and NE3, respectively.

When the setting button C is operated in a state in which the standard sample information is received in the standard sample screen A3, the received standard sample information is set in an unchangeable manner. In place of the standard sample screen A3, the calibration curve screen is displayed on the setting screen display area A as a fourth parameter setting screen, and the display mode of the plurality of step indexes B1 to B5 changes.

(d) Calibration Curve Screen

Figure 5:
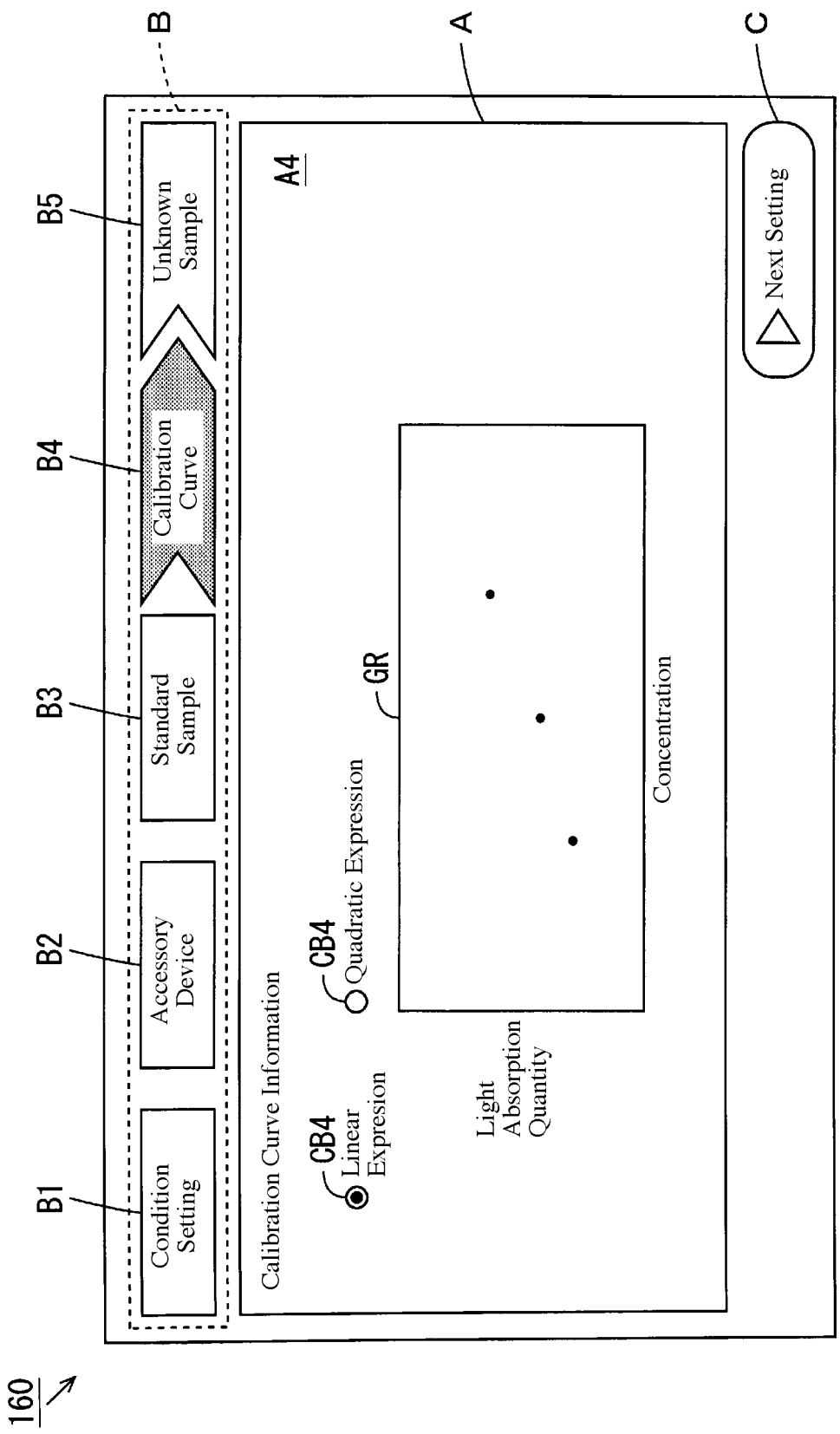
FIG. 5 is a diagram showing an example of a calibration curve screen.

FIG. 5 is a diagram showing an example of a calibration curve screen. At this time, parameters in the first through third steps have been set, and parameters in the fourth and fifth steps have not been set. Therefore, as shown in FIG. 5, the step indexes B1 to B3 respectively corresponding to the first to third steps are each displayed in a rectangular shape, and the step indexes B4 and B5 respectively corresponding to the fourth and fifth steps are each displayed in a ribbon-like shape. The step index B4 corresponding to the calibration curve screen A4 displayed in the setting screen display area A is displayed in a color different from the colors of the other step indexes B1 to B3 and B5.

In the calibration curve screen A4, the calibration curve information indicating the order of the calibration curve is received as a parameter. In the case of FIG. 5, the "linear expression" and the "quadratic expression" are displayed as the order of the calibration curve on the calibration curve screen A4. The calibration curve information is received by checking the check box CB4 displayed on the calibration curve screen A4 so as to correspond to the type of the calibration curve information.

In the calibration curve screen A4, graphs GR each indicating the relationship between the spectral characteristic value and the concentration of the plurality of standard samples set in standard sample screen A3 may be displayed. In this case, the user can easily specify the appropriate type of calibration curve information by visually recognizing the graph GR.

When the setting button C is operated in a state in which the calibration curve information is received on the calibration curve screen A4, the received calibration curve information is set in an unchangeable manner. Further, a calibration curve is generated based on the set calibration curve information and the standard sample information set in the third step. Further, in place of the calibration curve screen A4, an unknown sample screen is displayed on the setting screen display area A as the fifth parameter setting screen, and the display mode of the plurality of step indexes B1 to B5 changes.

(e) Unknown Sample Screen

Figure 6:
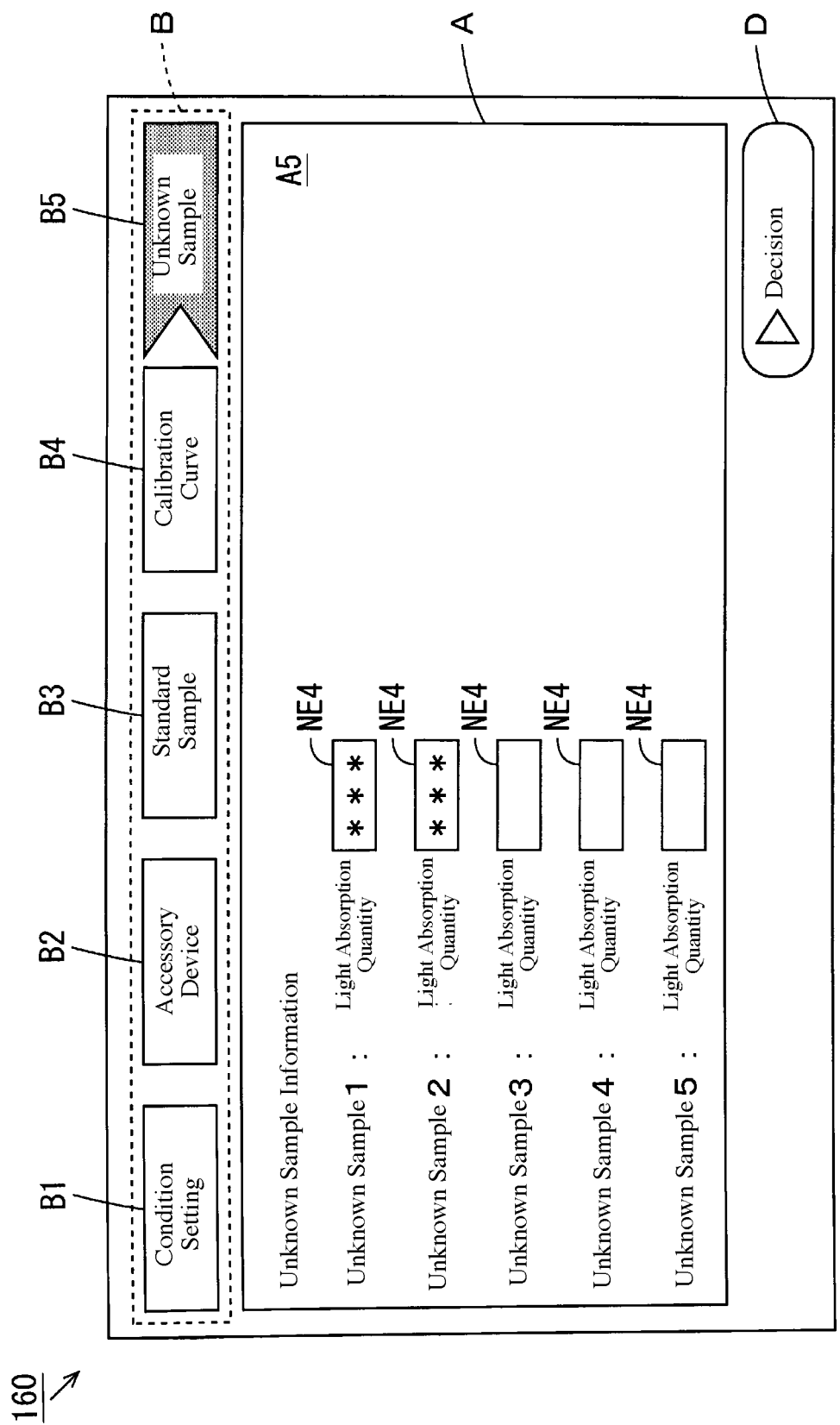
FIG. 6 is a diagram showing an example of an unknown sample screen.

FIG. 6 is a diagram showing an example of an unknown sample screen. At this time, parameters in the first to fourth steps have been set, and parameters in the fifth step has not been set. Therefore, as shown in FIG. 6, the step indexes B1 to B4 respectively corresponding to the first to fourth steps are each displayed in a rectangular shape, and the step index B5 corresponding to the fifth step is displayed in a ribbon shape. The step index B5 corresponding to the unknown sample screen A5 displayed in the setting screen display area A is displayed in a color different from the colors of the other step indexes B1 to B4.

In the unknown sample screen A5, unknown sample information indicating the spectral characteristic value of an unknown sample is received as parameters. In FIG. 6, the spectral characteristic values of a plurality of unknown samples can be received, and the "unknown sample 1" to the "unknown sample 5" are displayed as a plurality of unknown samples on the unknown sample screen A5. The respective unknown sample information is received by inputting the spectral characteristic value to the numeric input field NE4 displayed on the unknown sample screen A5 so as to correspond to the unknown sample information.

Here, the spectral characteristic value of the unknown sample measured by the spectrophotometer 200 of FIG. 1 based on the measurement condition and the accessory device information respectively set in the first and second steps will be input to the numeric input field NE4. In the example of FIG. 6, the spectral characteristic value is the "light absorption quantity". For the "unknown sample 1" and the "unknown sample 2", the "light absorption quantity" is input to the numeric input fields NE4.

Figure 7:
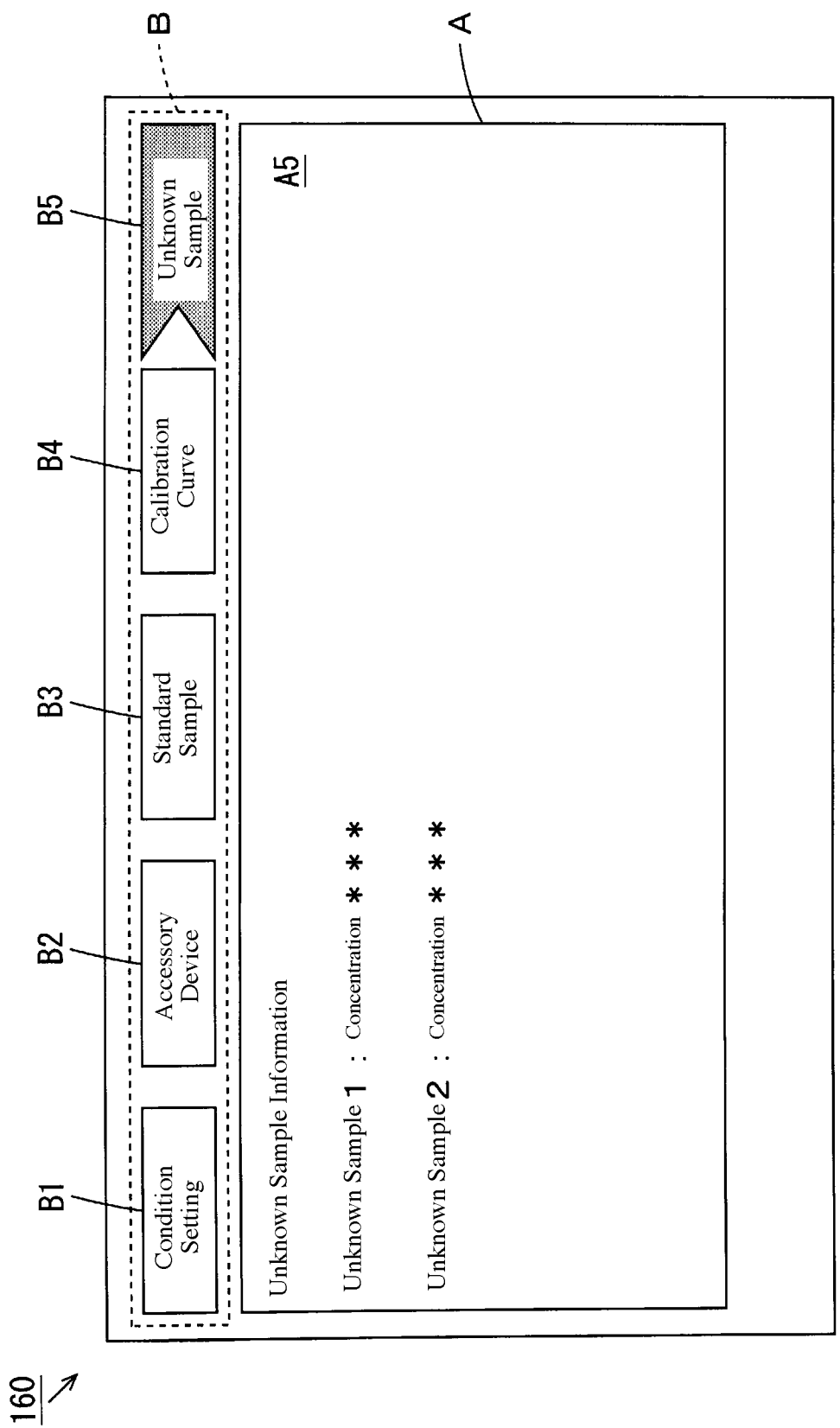
FIG. 7 is a diagram showing an example of an unknown sample screen after quantitation.

In the fifth step, in place of the setting button C in FIG. 2 to FIG. 5, the Decision button D is displayed at the lower portion of the display unit 160. When the decision button D is operated in a state in which the unknown sample information is received on the unknown sample screen A5, the received unknown sample information is set in an unchangeable manner. Further, the concentration of the unknown sample is quantified based on the set unknown sample information and the calibration curve generated in the fourth step. FIG. 7 is a diagram showing an example of the unknown sample screen after the quantitation. As shown in FIG. 7, the concentration of the quantified unknown sample is displayed on the unknown sample screen A5.

(f) Confirmation of Parameter Setting Screen

In the second to fifth steps, there is a case in which the user wants to confirm the previously set parameters. Under the circumstances, in this embodiment, by operating the step index corresponding to the step prior to the current step, it is possible to execute the confirmation processing for displaying the parameter setting screen corresponding to the operated step index on the setting screen display area A.

Figure 8:
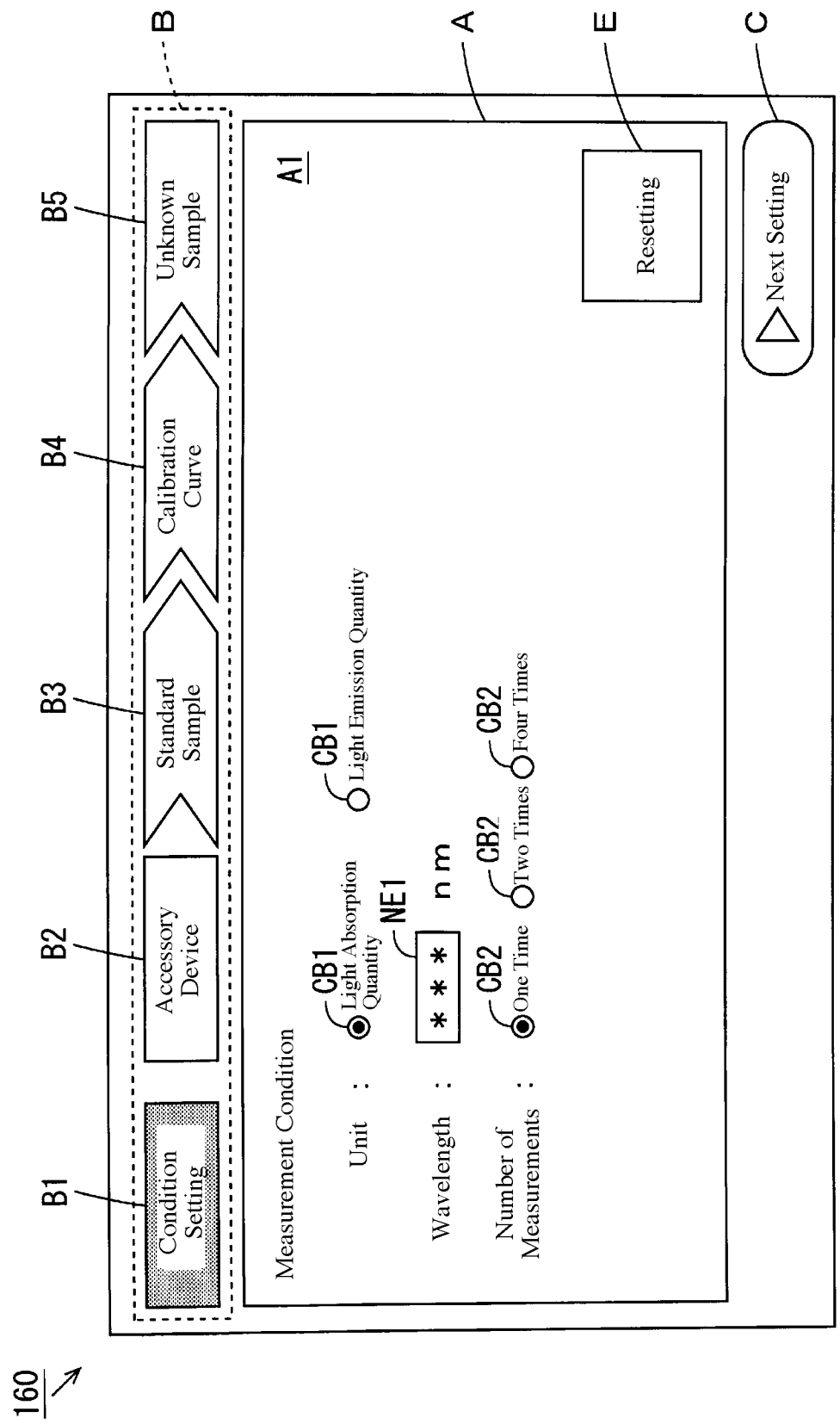
FIG. 8 is a diagram showing an example of a parameter setting screen in the checking processing.

FIG. 8 is a diagram showing an example of the parameter setting screen in the confirmation processing. For example, in the third step shown in FIG. 4, in the case of confirming a previously set measurement conditions, the user operates the step index B1. As a result, as shown in FIG. 8, the display of the setting screen display area A is switched from the display of the standard sample screen A3 to the display of the condition setting screen A1 corresponding to the step index B1.

In this state, the parameters in the first and second steps have been set, and the parameters in the third to fifth steps have not been set. Therefore, the step indexes B1 and B2 respectively corresponding to the first and second steps are each displayed in a rectangular shape, and the step indexes B3 to B5 respectively corresponding to the third to fifth steps are each displayed in a ribbon-like shape. Further, the step index B1 corresponding to the condition setting screen A1 displayed in the setting screen display area A is displayed in a color different from the colors of the other step indexes B2 to B5.

The user can confirm the measurement conditions by visually recognizing the condition setting screen A1 displayed in the setting screen display area A. Note that by operating the step index B2, the user can switch the display of the setting screen display area A to the display of the accessory device screen A2. Further, the user can switch (return) the display of the setting screen display area A to the standard sample screen A3 in which the parameter setting is being performed by operating the step index B3.

When the parameters set in the previous step are changed, parameters set in the later steps may become inappropriate. Therefore, in the parameter setting screen in which the confirmation processing is being performed, the change of the previously set parameters is not received. With this, it is possible to prevent the preset parameters from becoming inappropriate.

On the other hand, there is a case in which it is desired to change parameters set in the previous steps. Under the circumstances, during the the confirmation processing, a resetting button E is further displayed on the parameter setting screen corresponding to the step in which parameters have already been set. When the user wants to change the parameters set in any step, the user operates the resetting button E on the parameter setting screen in which the confirmation processing is being performed corresponding to the step.

In this case, the parameters corresponding to the step in which the resetting button E is operated is canceled, and the parameters corresponding to all of the steps later than the step are canceled. Further, the parameter setting screen corresponding to the step in which the resetting button E is operated is displayed in the setting screen display area A. As a result, the user can reset parameters to be changed. Further, since the parameters corresponding to the subsequent steps are also reset, it is possible to prevent the previously set parameter from becoming inappropriate.

(3) Spectroscopic Analysis Control Device

Figure 9:
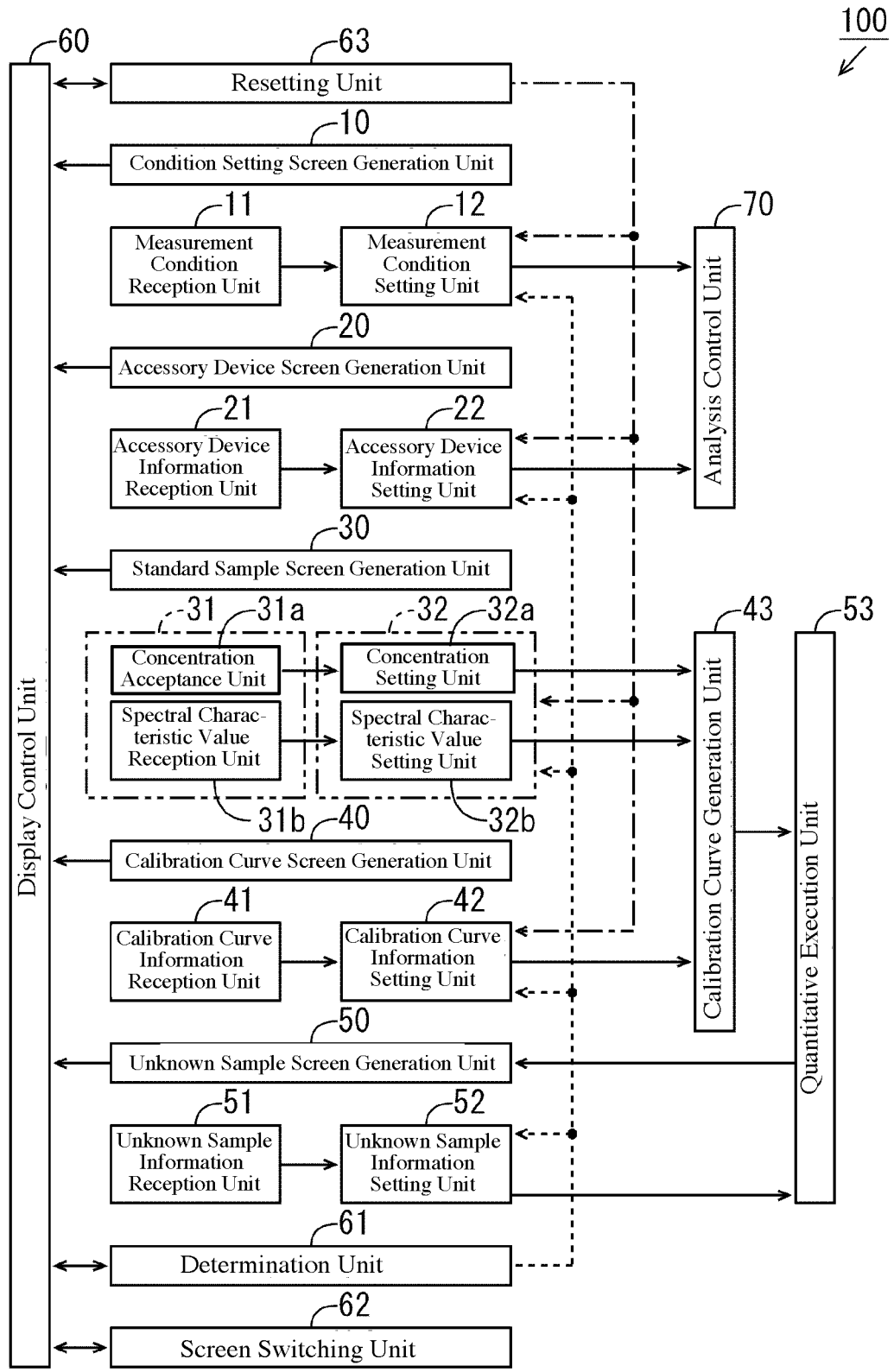
FIG. 9 is a block diagram showing a functional configuration of the spectroscopic analysis control device of FIG. 1.

FIG. 9 is a block diagram showing a functional configuration of the spectroscopic analysis control device 100 of FIG. 1. As shown in FIG. 9, the spectroscopic analysis control device 100 includes a condition setting screen generation unit 10, a measurement condition reception unit 11, a measurement condition setting unit 12, an accessory device screen generation unit 20, an accessory device information reception unit 21, an accessory device information setting unit 22, a standard sample screen generation unit 30, a standard sample information reception unit 31, and a standard sample information setting unit 32. Further, the spectroscopic analysis control device 100 includes a calibration curve screen generation unit 40, a calibration curve information reception unit 41, a calibration curve information setting unit 42, a calibration curve generation unit 43, an unknown sample screen generation unit 50, an unknown sample information reception unit 51, an unknown sample information setting unit 52, a quantitative execution unit 53, a display control unit 60, a determination unit 61, a screen switching unit 62, a resetting unit 63, and an analysis control unit 70.

When the CPU 110 of FIG. 1 executes a spectroscopic analysis control program stored in the storage device 140, the functions of the components (10 to 12, 20 to 22, 30 to 32, 40 to 43, 50 to 53, 60 to 64, 70) of the spectroscopic analysis control device 100 are realized. Some or all of the components (10 to 12, 20 to 22, 30 to 32, 40 to 43, 50 to 53, 60 to 64, 70) of the spectroscopic analysis control device 100 may be realized by a hardware such as an electronic circuitry.

In FIG. 9, for the purpose of facilitating the visibility, the connection between the determination unit 61 and the measurement condition setting unit 12, the accessory device information setting unit 22, the standard sample information setting unit 32, the calibration curve information setting unit 42, and the unknown sample information setting unit 52 is indicated by dotted lines. The connection between the resetting unit 63 and the measurement condition setting unit 12, the accessory device information setting unit 22, the standard sample information setting unit 32, and the calibration curve information setting unit 42 are indicated by dash-dot lines.

The condition setting screen generation unit 10 generates condition setting screen data for displaying the condition setting screen A1 of FIG. 2. The measurement condition reception unit 11 receives measurement conditions on the condition setting screen A1 displayed in the setting screen display area A.

The measurement condition setting unit 12 sets measurement conditions received by the measurement condition reception unit 11 in response to that the determination instruction is given. The measurement condition setting unit 12 cancels the set measurement conditions in response to that a resetting instruction is given.

The accessory device screen generation unit 20 generates accessory device screen data for displaying the accessory device screen A2 of FIG. 3. The accessory device information reception unit 21 receives the accessory device information on the accessory device screen A2 displayed in the setting screen display area A.

The accessory device information setting unit 22 sets accessory device information received by the accessory device information reception unit 21 in response to that the determination instruction is given. Further, the accessory device information setting unit 22 cancels the set accessory device information in response to that a resetting instruction is given. Further, the accessory device information setting unit 22 cancels the set accessory device information even in cases where a resetting instruction is given to the measurement condition setting unit 12.

The standard sample screen generation unit 30 generates standard sample screen data for displaying the standard sample screen A3 of FIG. 4. The standard sample information reception unit 31 includes the concentration reception unit 31a and the spectral characteristic value reception unit 31b. The concentration reception unit 31a and the spectral characteristic value reception unit 31b receive the concentration and the spectral characteristic value of the standard sample in the standard sample screen A3 displayed in setting screen display area A, respectively.

The standard sample information setting unit 32 includes the concentration setting unit 32a and the spectral characteristic value setting unit 32b. The concentration setting unit 32a and the spectral characteristic value setting unit 32b set the concentration and the spectral characteristic value received by the concentration reception unit 31a and the spectral characteristic value reception unit 31b, respectively, in response to that a determination instruction is given. Further, the concentration setting unit 32a and the spectral characteristic value setting unit 32b cancel the set concentration and spectral characteristic value, respectively, in response to that a resetting instruction is given. Further, the concentration setting unit 32a and the spectral characteristic value setting unit 32b cancel the set concentration and the set spectral characteristic value, respectively, even in cases where a resetting instruction is given to the measurement condition setting unit 12 or the accessory device information setting unit 22.

The calibration curve screen generation unit 40 generates calibration curve screen data for displaying the calibration curve screen A4 of FIG. 5. The calibration curve information reception unit 41 receives the calibration curve information on the calibration curve screen A4 displayed in the setting screen display area A.

The calibration curve information setting unit 42 sets the calibration curve information received by the calibration curve information reception unit 41 in response to that the resetting instruction is given. Further, the calibration curve information setting unit 42 cancels the set calibration curve information in response to that the resetting instruction is given. Further, the calibration curve information setting unit 42 cancels the set calibration curve information even in cases where the resetting instruction is given to the measurement condition setting unit 12, the accessory device information setting unit 22, or the standard sample information setting unit 32.

The calibration curve generation unit 43 generates a calibration curve based on the concentration set by the concentration setting unit 32a, the spectral characteristic value set by the spectral characteristic value setting unit 32b, and the calibration curve information set by the calibration curve information setting unit 42. When any one of the concentration set by the concentration setting unit 32a, the spectral characteristic value set by the spectral characteristic value setting unit 32b, and the calibration curve information set by the calibration curve information setting unit 42 is canceled, the calibration curve generation unit 43 cancels the generated calibration curve.

The unknown sample screen generation unit 50 generates an unknown sample screen data for displaying the unknown sample screen A5 of FIG. 6. The unknown sample information reception unit 51 receives unknown sample information in the unknown sample screen A5 displayed on the setting screen display area A.

The unknown sample information setting unit 52 sets unknown sample information received by the unknown sample information reception unit 51 in response to that a determination instruction is given. Further, the unknown sample information setting unit 52 cancels the set unknown sample information in response to that the resetting instruction is given. Further, the unknown sample information setting unit 52 cancels the set unknown sample information even in cases where a resetting instruction is given to the measurement condition setting unit 12, the accessory device information setting unit 22, the standard sample information setting unit 32, or the calibration curve information setting unit 42.

The quantitative execution unit 53 quantifies the concentration of the unknown sample based on the calibration curve generated by the calibration curve generation unit 43 and the unknown sample information set by the unknown sample information setting unit 52. Further, the quantitative execution unit 53 gives the unknown sample screen generation unit 50 the information indicating the concentration of the quantified unknown sample. With this, the quantified concentration of the unknown sample is displayed on the unknown sample screen A5 of FIG. 7.

In the above-described configuration, each of the measurement condition reception unit 11, the accessory device information reception unit 21, the standard sample information reception unit 31, the calibration curve information reception unit 41, and the unknown sample information reception unit 51 is an example of the parameter reception unit. Each of the measurement condition setting unit 12, the accessory device information setting unit 22, the standard sample information setting unit 32, the calibration curve information setting unit 42, and the unknown sample information setting unit 52 is an example of the parameter setting unit.

The display control unit 60 displays the step indexes B1 to B5 of FIG. 2 to FIG. 6 in the step index display area B. The display control unit 60 displays in the setting screen display area A a parameter setting screen based on the screen data generated by the condition setting screen generation unit 10, the accessory device screen generation unit 20, the standard sample screen generation unit 30, the calibration curve screen generation unit 40, or the unknown sample screen generation unit 50. Further, the display control unit 60 controls the display unit 160 to change the display mode of step indexes B1 to B5 and the change of the parameter setting screen displayed in response to a decision instruction, an instruction to switch the display of the parameter setting screen, or an instruction to reset the display.

In cases where the setting button C of FIG. 2 to FIG. 5 is operated in the first to fourth steps, the determination unit 61 gives an instruction to determination parameters to the measurement condition setting unit 12, the accessory device information setting unit 22, the standard sample information setting unit 32, or the calibration curve information setting unit 42. Further, when the decision button D of FIG. 6 is operated in the fifth step, the determination unit 61 gives a parameter determination instruction to the unknown sample information setting unit 52. Further, when the setting button C or the decision button D is operated, the determination unit 61 gives a parameter determination instruction also to the display control unit 60.

When a step index corresponding to the step in which parameters have been set or the step in which parameters are being set is operated, the screen switching unit 62 gives an instruction to switch the parameter setting screen displays to the display control unit 60. When the resetting button E of FIG. 8 is operated during the confirmation processing in the second to fifth step steps, the resetting unit 63 gives an instruction to reset parameters to the measurement condition setting unit 12, the accessory device information setting unit 22, the standard sample information setting unit 32, or the calibration curve information setting unit 42, respectively. Further, when the resetting button E is operated, the resetting unit 63 gives an instruction to reset parameters also to the display control unit 60.

The analysis control unit 70 controls the operation of the spectrophotometer 200 of FIG. 1 based on the measurement conditions set by the measurement condition setting unit 12. The analysis control unit 70 acquires spectral characteristic values of the standard sample and the unknown sample measured by the spectrophotometer 200 of FIG. 1 based on measurement conditions and accessory device information set by the measurement condition setting unit 12 and the accessory device information setting unit 22, respectively.

(4) Spectroscopic Analysis Control Processing

Figure 10:
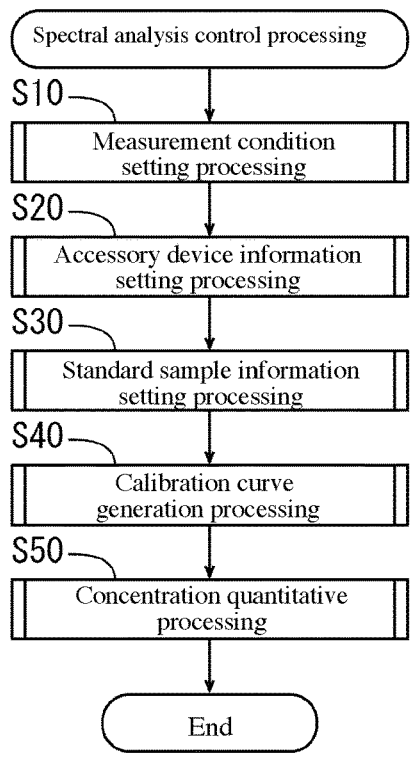
FIG. 10 is a flowchart showing an algorithm of a spectroscopic analysis control processing performed by a spectroscopic analysis control program.

FIG. 10 is a flowchart showing an algorithm of spectroscopic analysis control processing performed by a spectroscopic analysis control program. In the spectroscopic analysis control processing, first, the measurement condition setting processing is executed (Step S10). Next, accessory device information setting processing is executed (Step S20). Next, the standard sample information setting processing is executed (Step S30). Thereafter, the calibration curve generation processing is executed (Step S40). Finally, the concentration quantitative processing is executed (Step S50). Hereinafter, the measurement condition setting processing, the accessory device information setting processing, the standard sample information setting processing, calibration curve generation processing, and the concentration quantitative processing will be described in detail.

(a) Measurement Condition Setting Processing

Figure 11:
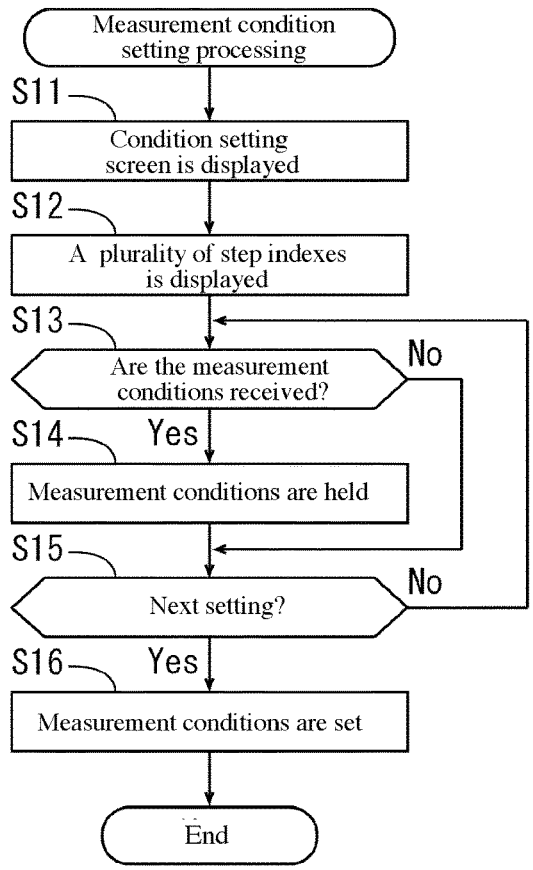
FIG. 11 is a flowchart showing an algorithm of measurement condition setting processing in the spectroscopic analysis control processing of FIG. 10.

FIG. 11 is a flowchart showing the algorithm of the measurement condition setting processing of the spectroscopic analysis control processing of FIG. 10. First, the display control unit 60 displays the condition setting screen A1 of FIG. 2 on the setting screen display area A based on the condition setting screen data generated by the condition setting screen generation unit 10 (Step S11). Further, the display control unit 60 displays a plurality of step indexes B1 to B5 in the step index display area B (Step S12).

In Step S12, the step indexes B1 to B5 are each displayed in a ribbon-shape. Further, the step index B1 is displayed differently from the other step indexes B2 to B5. Any of steps S11 and S12 may be executed first or both of them may be executed simultaneously.

Next, the measurement condition reception unit 11 determines whether or not measurement conditions have been received in the condition setting screen A1 of Step S11 (Step S13). The user can input measurement conditions by checking one of the plurality of check boxes CB1 of FIG. 2, inputting a numeric value on the numeric input field NE1, and checking any of the plurality of check boxes CB2.

In cases where measurement conditions are not received, the measurement condition reception unit 11 proceeds to Step S15. When the measurement conditions are received, the measurement condition reception unit 11 holds the received measurement conditions (Step S14) and proceeds to Step S15.

In Step S15, the determination unit 61 determines whether or not it has been instructed to proceed to the subsequent setting (Step S15). The user can instruct to proceed to the subsequent setting by operating the setting button C of FIG. 2. When it is not instructed to proceed to the subsequent setting, the determination unit 61 returns to Step S13. Note that when no measurement conditions are held in Step S14, it is not instructed to proceed to the subsequent setting in Step S15.

Steps S13 to S15 are repeated until it is instructed to proceed to the subsequent setting in step S15. When it is instructed to proceed to the subsequent setting, the measurement condition setting unit 12 sets the measurement conditions held in Step S14 (Step S16), and ends the measurement condition setting processing.

(b) Accessory Device Information Setting Processing

Figure 12:
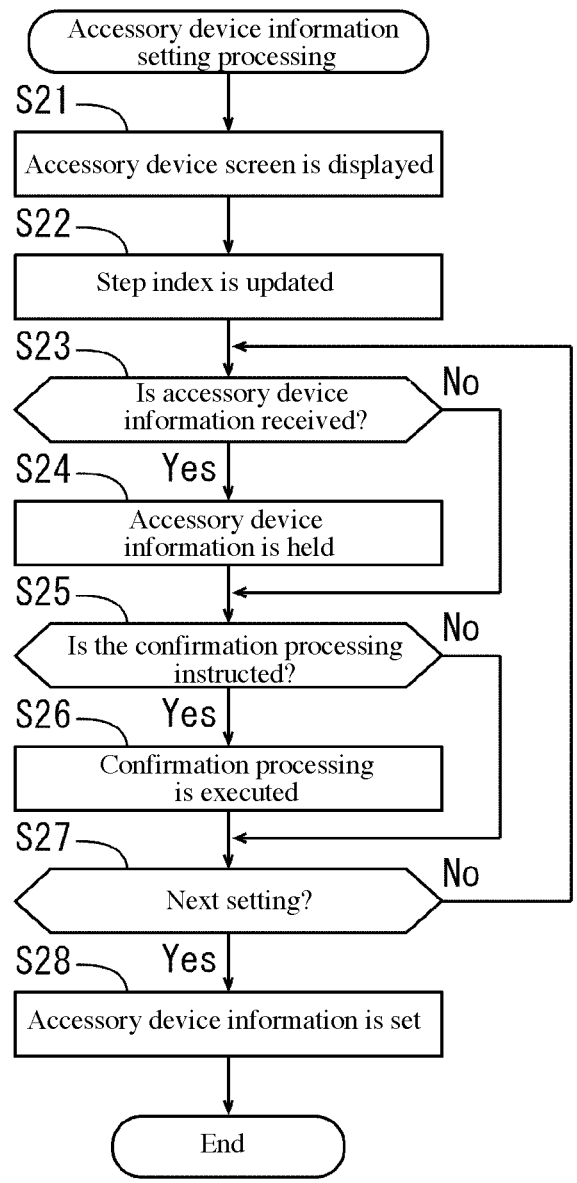
FIG. 12 is a flowchart showing an algorithm of the accessory device information setting processing in the spectroscopic analysis control processing of FIG. 10.

FIG. 12 is a flowchart showing an algorithm of the accessory device information setting processing in the spectroscopic analysis control processing of FIG. 10. First, the display control unit 60 displays the accessory device screen A2 of FIG. 3 in setting screen display area A based on the accessory device screen data generated by the accessory device screen generation unit 20 (Step S21). Further, the display control unit 60 updates the display mode of the plurality of step indexes B1 to B5 (Step S22).

In Step S22, the step index B1 is displayed in a rectangular shape, and the step indexes B2 to B5 are each displayed in a ribbon-like shape. The step index B2 is displayed in a color different from the colors of the other step indexes B1, B3 to B5. Any one of Steps S21 and S22 may be executed first or both of them may be executed at the same time.

Next, the accessory device information reception unit 21 determines whether or not the accessory device information has been received in the accessory device screen A2 of Step S21 (Step S23). The user can input the accessory device information by checking any one of the plurality of checkboxes CB3 of FIG. 3.

When accessory device information is not received, the accessory device information reception unit 21 proceeds to Step S25. When accessory device information is received, the accessory device information reception unit 21 holds the received accessory device information (Step S24) and proceeds to Step S25.

In Step S25, the screen switching unit 62 determines whether or not a confirmation processing has been instructed (Step S25). The user can instruct the confirmation processing by operating the step index B1 or B2. When no confirmation processing is instructed, the screen switching unit 62 proceeds to Step S27. When the confirmation processing is instructed, the screen switching unit 62 executes the confirmation processing (Step S26).

During the confirmation processing of Step S26, either the condition setting screen A1 or the accessory device screen A2 is displayed in the setting screen display area A. The colors of the step indexes B1 and B2 are changed according to the parameter setting screen displayed in the setting screen display area A.

The resetting button E (FIG. 8) is displayed on the condition setting screen A1, and it is determined by the resetting unit 63 whether or not the resetting button E of the condition setting screen A1 is operated. When the resetting button E of the condition setting screen A1 is not operated, the resetting unit 63 proceeds to Step S27. On the other hand, when the resetting button E of the condition setting screen A1 is operated, the measurement condition setting unit 12 cancels the measurement condition set in Step S16 of FIG. 11, and returns to the measurement condition setting processing of Step S10.

In Step S27, the determination unit 61 determines whether or not it has been instructed to proceed to the subsequent setting (Step S27). The user can instruct to proceed to the subsequent setting by operating the setting button C in FIG. 3. When it is not instructed to proceed to the subsequent setting, the determination unit 61 returns to Step S23. Note that when the accessory device information is not held in Step S24, it is not instructed to proceed to the subsequent setting in Step S27.

Step S23 to S27 are repeated until resetting is instructed in the confirmation processing of Step S26 or until the next setting is instructed to proceed in Step S27. When it is instructed to proceed to the subsequent setting, the accessory device information setting unit 22 sets the accessory device information held in Step S24 (Step S28), and ends the accessory device information setting processing.

(c) Standard Sample Information Setting Processing

Figure 13:
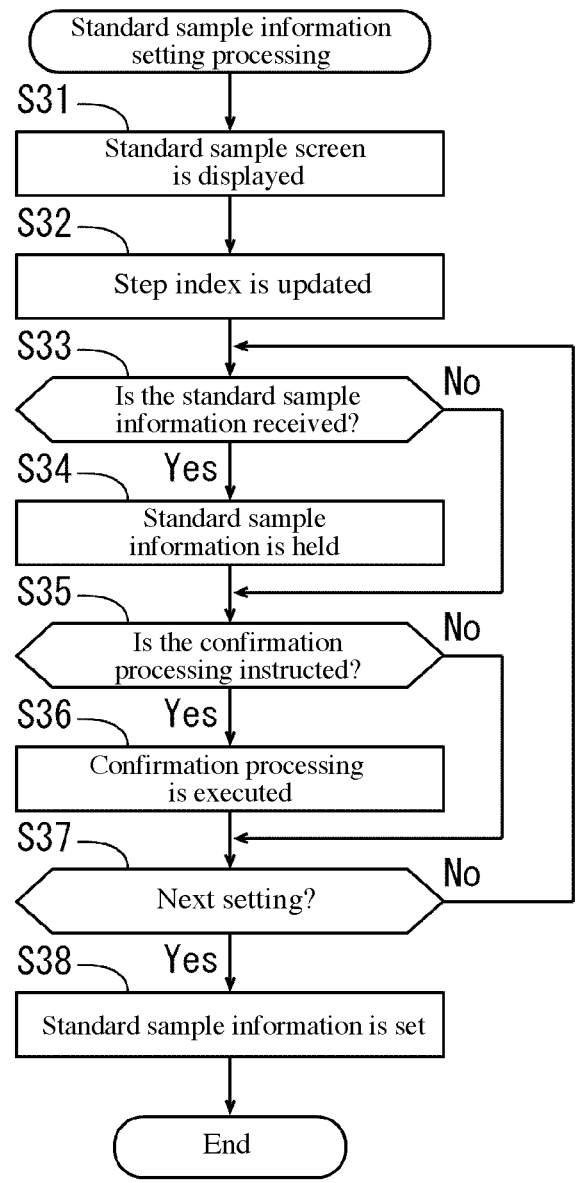
FIG. 13 is a flowchart showing an algorithm of the standard sample information setting processing in the spectroscopic analysis control processing of FIG. 10.

FIG. 13 is a flowchart showing an algorithm of the standard sample information setting processing in the spectroscopic analysis control processing of FIG. 10. First, the display control unit 60 displays the standard sample screen A3 of FIG. 4 in the setting screen display area A based on the standard sample screen data generated by the standard sample screen generation unit 30 (Step S31). Further, the display control unit 60 updates the display mode of the plurality of step indexes B1 to B5 (Step S32).

In Step S32, the step indexes B1 and B2 are each displayed in a rectangular shape, and the step indexes B3 to B5 are each displayed in a ribbon-like shape. Further, the step index B3 is displayed in a color different from the colors of the other step indexes B1, B2, B4, and B5. Note that any one of Steps S31 and S32 may be executed first or both of them may be executed simultaneously.

Next, the standard sample information reception unit 31 determines whether or not the standard sample information has been received on the standard sample screen A3 of Step S31 (Step S33). The user can input the standard sample information by inputting numerical values in the plurality of numeric input fields NE2 and NE3 in FIG. 4.

Specifically, the user inputs the concentrations of the plurality of standard samples to the plurality of numeric input fields NE2, respectively. The user attaches the plurality of standard samples to the sample stage 230 of the spectrophotometer 200 of FIG. 1 in sequence. When the standard sample is a liquid or a gas, the standard sample is attached to the sample stage 230 in a state in which the standard sample is injected in the sample cell 310. The analysis control unit 70 controls the spectrophotometer 200 of FIG. 1 to perform the spectroscopic measurement of each standard sample based on the measurement conditions set in Step S16 of the measurement condition setting processing and the accessory device information set in Step S28 of the accessory device information setting processing. Further, the analysis control unit 70 acquires spectral characteristic values of each standard sample measured by the spectrophotometer 200. The user inputs spectral characteristic values of the plurality of standard samples acquired by the analysis control unit 70 to the plurality of numeric input fields NE3, respectively. Note that the spectral characteristic values of the plurality of standard samples acquired by the analysis control unit 70 may be automatically input to the plurality of numeric input fields NE3.

When the standard sample information is not received in Step S33, the standard sample information reception unit 31 proceeds to Step S35. When the standard sample information is received, the standard sample information reception unit 31 holds the received standard sample information (Step S34) and proceeds to Step S35.

In Step S35, the screen switching unit 62 determines whether or not confirmation processing has been instructed (Step S35). The user can instruct the confirmation processing by operating the step indexes B1 to B3. When the confirmation processing is not instructed, the screen switching unit 62 proceeds to Step S37. When the confirmation processing is instructed, the screen switching unit 62 executes the confirmation processing (Step S36).

During the confirmation processing of Step S36, any one of the condition setting screen A1, the accessory device screen A2, and the standard sample screen A3 is displayed on the setting screen display area A. Further, the colors of step indexes B1 to B3 are changed according to the parameter setting screen displayed in the setting screen display area A.

Here, the resetting button E (FIG. 8) is displayed on the condition setting screen A1 and the accessory device screen A2. Further, whether or not the resetting button E of the condition setting screen A1 or the accessory device screen A2 is operated is determined by the resetting unit 63. When the resetting button E is not operated, the resetting unit 63 proceeds to Step S37.

On the other hand, when the resetting button E of the condition setting screen A1 is operated, the accessory device information setting unit 22 cancels the accessory device information set in Step S28 of FIG. 12. Further, the measurement condition setting unit 12 cancels the measurement conditions set in Step S16 of FIG. 11, and returns to the measurement condition setting processing of Step S10.

When the resetting button E of the accessory device screen A2 is operated, accessory device information setting unit 22 cancels the accessory device information set in Step S28 of FIG. 12, and returns to the accessory device information setting processing of Step S20.

In Step S37, the determination unit 61 determines whether or not an instruction to proceed to the subsequent setting has been issued (Step S37). The user can instruct to proceed to the subsequent setting by operating the setting button C in FIG. 4. When it is not instructed to proceed to the subsequent setting, the determination unit 61 returns to Step S33. Note that when the standard sample information is not held in Step S34, it is not instructed to proceed to the subsequent setting in Step S37.

Step S33 to S37 are repeated until the resetting is instructed in the confirmation processing of Step S36 or until the next setting is instructed to proceed in Step S37. When it is instructed to proceed to the subsequent setting, the standard sample information setting unit 32 sets the standard sample information held in Step S34 (Step S38), and ends the standard sample information setting processing.

(d) Calibration Curve Generation Processing

Figure 14:
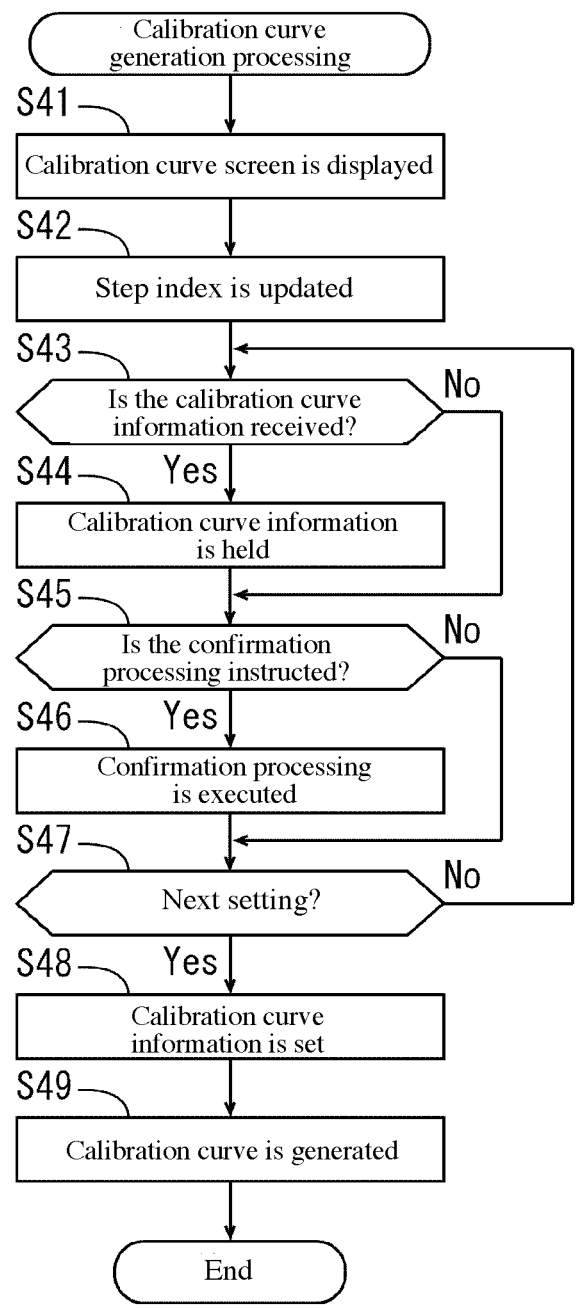
FIG. 14 is a flowchart showing an algorithm of the calibration curve generation processing in the spectroscopic analysis control processing of FIG. 10.

FIG. 14 is a flowchart showing an algorithm of the calibration curve generation processing in the spectroscopic analysis control processing of FIG. 10. First, the display control unit 60 displays the calibration curve screen A4 of FIG. 5 on the setting screen display area A based on the calibration curve screen data generated by the calibration curve screen generation unit 40 (Step S41). Further, the display control unit 60 updates the display mode of the plurality of step indexes B1 to B5 (Step S42).

In Step S42, the step indexes B1 to B3 are each displayed in a rectangular shape, and the step indexes B4 and B5 are each displayed in a ribbon-like shape. Further, the step index B4 is displayed in a color different from the colors of the other step indexes B1 to B3, and B5. Note that either Step S41 or S42 may be executed first or both of them may be executed simultaneously.

Next, the calibration curve information reception unit 41 determines whether or not the calibration curve information has been received on the calibration curve screen A4 of Step S41 (Step S43). The user can input the calibration curve information by checking any one of the plurality of check boxes CB4 of FIG. 5.

When the calibration curve information is not received, the calibration curve information reception unit 41 proceeds to Step S45. When the calibration curve information is received, the calibration curve information reception unit 41 holds the received calibration curve information (Step S44) and proceeds to Step S45.

In Step S45, the screen switching unit 62 determines whether or not a confirmation processing has been instructed (Step S45). The user can instruct the confirmation processing by operating the step indexes B1 to B4. When the confirmation processing is not instructed, the screen switching unit 62 proceeds to Step S47. When the confirmation processing is instructed, the screen switching unit 62 executes the confirmation processing (Step S46).

During the confirmation processing of Step S46, any one of the condition setting screen A1, the accessory device screen A2, the standard sample screen A3, and the calibration curve screen A4 is displayed in the setting screen display area A. Further, the colors of the step indexes B1 to B4 are changed according to the parameter setting screen displayed in the setting screen display area A.

Here, the resetting button E (FIG. 8) is displayed on the condition setting screen A1, the accessory device screen A2, and the standard sample screen A3. Further, whether or not the resetting button E of the condition setting screen A1, the accessory device screen A2, or the standard sample screen A3 is operated is determined by the resetting unit 63. When the resetting button E is not operated, the resetting unit 63 proceeds to Step S47.

On the other hand, when the resetting button E of the condition setting screen A1 is operated, the standard sample information setting unit 32 cancels the standard sample information set in Step S38 of FIG. 13. Further, the accessory device information setting unit 22 cancels the accessory device information set in Step S28 of FIG. 12. Further, the measurement condition setting unit 12 cancels the measurement condition set in Step S16 of FIG. 11, and returns to the measurement condition setting processing of Step S10.

When the resetting button E of the accessory device screen A2 is operated, the standard sample information setting unit 32 cancels the standard sample information set in Step S38 of FIG. 13. The accessory device information setting unit 22 cancels the accessory device information set in Step S28 of FIG. 12, and returns to the accessory device information setting processing of Step S20.

When the resetting button E of the standard sample screen A3 is operated, the standard sample information setting unit 32 cancels the standard sample information set in Step S38 of FIG. 13, and returns to the standard sample information setting processing of Step S30.

In Step S47, the determination unit 61 determines whether or not an instruction to proceed to the subsequent setting has been issued (Step S47). The user can instruct to proceed to the subsequent setting by operating the setting button C in FIG. 5. When it is not instructed to proceed to the subsequent setting, the determination unit 61 returns to Step S43. Note that when the calibration curve information is not held in Step S44, it is not instructed to proceed to the subsequent setting in Step S47.

Steps S43 to S47 are repeated until resetting is instructed in the confirmation processing of Step S46 or until the next setting is instructed to proceed to in Step S47. When it is instructed to proceed to the subsequent setting, the calibration curve information setting unit 42 sets the calibration curve information held in Step S44 (Step S48).

Thereafter, the calibration curve generation unit 43 generates a calibration curve based on the standard sample information set in Step S38 of the calibration curve information and the standard sample information setting processing set in Step S48 (Step S49), and terminates the calibration curve generation processing.

(e) Concentration Quantitative Processing

Figure 15:
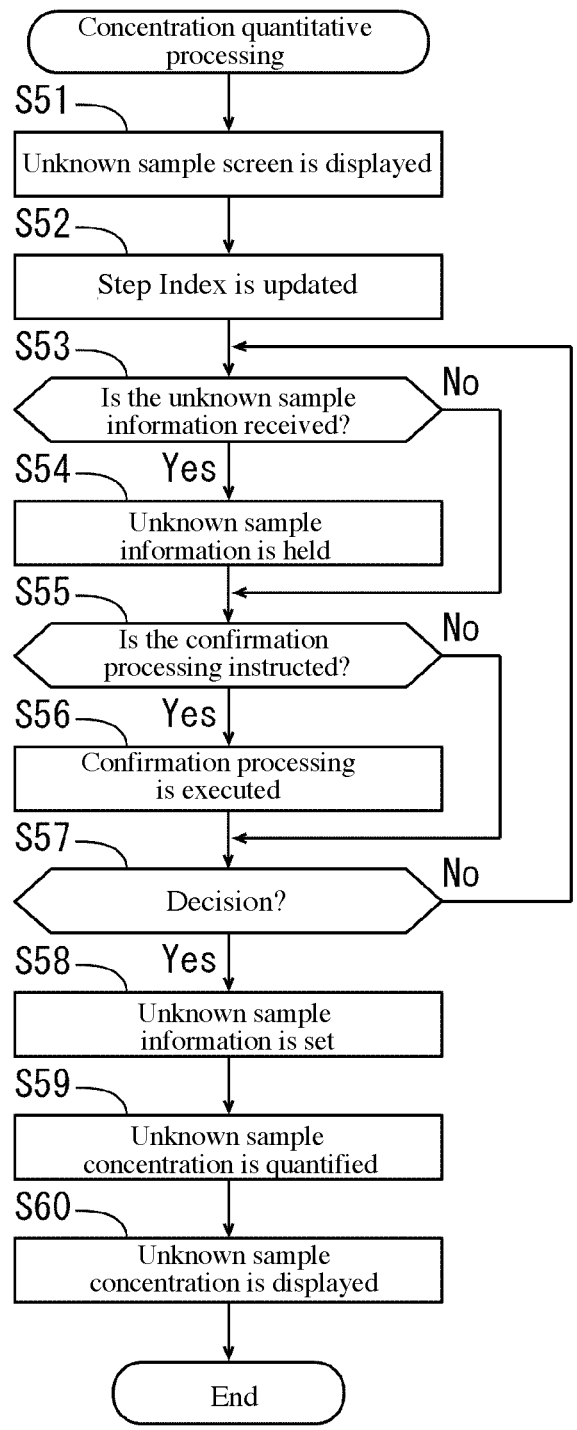
FIG. 15 is a flowchart showing an algorithm of the concentration quantitative processing in the spectroscopic analysis control processing of FIG. 10.

FIG. 15 is a flowchart showing an algorithm of the concentration quantitative processing in the spectroscopic analysis control processing of FIG. 10. First, the display control unit 60 displays the unknown sample screen A5 of FIG. 6 in the setting screen display area A based on unknown sample screen data generated by the unknown sample screen generation unit 50 (Step S51). Further, the display control unit 60 updates the display mode of the plurality of step indexes B1 to B5 (Step S52).

In Step S52, the step indexes B1 to B4 are each displayed in a rectangular shape, and the step index B5 is displayed in a ribbon-like shape. Further, the step index B5 is displayed in a color different from the colors of the other step indexes B1 to B4. Note that either Step S51 or S52 may be executed first or both of them may be executed simultaneously.

Next, the unknown sample information reception unit 51 determines whether or not the unknown sample information has been received in the unknown sample screen A5 of Step S51 (Step S53). The user may input the unknown sample information by inputting numerical values into one or more numeric input fields NE4 of FIG. 6.

In particular, the user may sequentially attach one or more unknown samples to the sample stage 230 of the spectrophotometer 200 of FIG. 1. When the unknown sample is a liquid or a gas, it is attached to the sample stage 230 in a state in which the unknown sample is injected in the sample cell 310. The analysis control unit 70 controls the spectrophotometer 200 of FIG. 1 to perform spectroscopic measurement of the unknown sample based on the measurement condition set in Step S16 of the measurement condition setting processing and the accessory device information set in Step S28 of the accessory device information setting processing. Further, the analysis control unit 70 acquires spectral characteristic values of each unknown sample measured by the spectrophotometer 200. The user inputs the spectral characteristic values of the one or more unknown samples acquired by the analysis control unit 70 into the one or more numeric input fields NE4, respectively. Note that the spectral characteristic values of one or more samples obtained by the analysis control unit 70 may be automatically input to one or more numeric input fields NE4.

When unknown sample information is not received, the unknown sample information reception unit 51 proceeds to Step S55. When the unknown sample information is received, the unknown sample information reception unit 51 holds the received unknown sample information (Step S54) and proceeds to Step S55.

In Step S55, the screen switching unit 62 determines whether or not a confirmation processing has been instructed (Step S55). The user can instruct confirmation processing by operating the step indexes B1 to B5. When the confirmation processing is not instructed, the screen switching unit 62 proceeds to Step S57. When the confirmation processing is instructed, the screen switching unit 62 executes the confirmation processing (Step S56).

During the confirmation processing of Step S56, any one of the condition setting screen A1, the accessory device screen A2, the standard sample screen A3, the calibration curve screen A4, and the unknown sample screen A5 is displayed in the setting screen display area A. Also, the colors of the step indexes B1 to B5 are changed according to the parameter setting screen displayed in the setting screen display area A.

The resetting button E (FIG. 8) is displayed on the condition setting screen A1, the accessory device screen A2, the standard sample screen A3, and the calibration curve screen A4. Whether or not the resetting button E of the condition setting screen A1, the accessory device screen A2, the standard sample screen A3, or the calibration curve screen A4 is operated is determined by the resetting unit 63. When the resetting button E is not operated, the resetting unit 63 proceeds to Step S57.

On the other hand, when the resetting button E of the condition setting screen A1 is operated, the calibration curve information setting unit 42 cancels the calibration curve information set in Step S48 of FIG. 14. The standard sample information setting unit 32 cancels the standard sample information set in Step S38 of FIG. 13. Further, the accessory device information setting unit 22 cancels the accessory device information set in Step S28 of FIG. 12. Further, the measurement condition setting unit 12 cancels the measurement conditions set in Step S16 of FIG. 11, and returns to the measurement condition setting processing of Step S10.

When the resetting button E of the accessory device screen A2 is operated, the calibration curve information setting unit 42 cancels the calibration curve information set in Step S48 of FIG. 14. Further, the standard sample information setting unit 32 cancels the standard sample information set in Step S38 of FIG. 13. Further, the accessory device information setting unit 22 cancels the accessory device information set in Step S28 of FIG. 12, and returns to the accessory device information setting processing of Step S20.

When the resetting button E of the standard sample screen A3 is operated, the calibration curve information setting unit 42 cancels the calibration curve information set in Step S48 of FIG. 14. Further, the standard sample information setting unit 32 cancels the standard sample information set in Step S38 of FIG. 13, and returns to the standard sample information setting processing of Step S30.

When the resetting button E of the calibration curve screen A4 is operated, the calibration curve information setting unit 42 cancels the calibration curve information set in Step S48 of FIG. 14, and returns to the calibration curve generation processing of Step S40.

In Step S57, the determination unit 61 determines whether or not the determination is instructed (Step S57). The user can instruct the determination by operating the decision button D in FIG. 6. When the determination is not instructed, the determination unit 61 returns to Step S53. Note that when the unknown sample information is not held in Step S54, the determination is not instructed in Step S57.

Steps S53 to S57 are repeated until resetting is instructed in the confirmation processing of Step S56 or until the determination is instructed in Step S57. When a determination is indicated, the unknown sample information setting unit 52 sets the unknown sample information held in Step S54 (Step S58).

Thereafter, the quantitative execution unit 53 quantifies the concentration of the unknown sample based on the calibration curve generated in Step S49 of the unknown sample information and the calibration curve generation processing set in Step S58 (Step S59). The display control unit 60 displays the concentration of the unknown sample determined in Step S59 on the display unit 160 (Step S60), and ends the concentration quantitative processing.

(5) Effects

According to the spectroscopic analysis control device 100 of this embodiment, inputting of parameters in each step is received from the parameter setting screen corresponding to the step displayed on the display unit 160. When the previously set parameters are changed, there is a case in which parameters corresponding to the subsequent step become inappropriate due to the change of parameters. Under the circumstances, every time the acceptance of inputting of parameters corresponding to one step is completed, the received parameters are set in an unchangeable manner, and the parameter setting screen corresponding to the subsequent step is displayed on the display unit 160. This can prevent parameters corresponding to the subsequent step from becoming inappropriate due to the change of parameters corresponding to the previous step. Further, the user can easily input predetermined parameters in a predetermined order without mistaking the order of inputting of the parameters.

Further, the step index corresponding to the current step is displayed in the display unit 160 in such a manner so as to be distinguishable from the other step indexes. Therefore, the user can easily confirm that the currently inputting parameters are parameters corresponding to which step in all steps. Therefore, the user is not required to switch the parameter setting screen displays to confirm the current step. As a result, the operability of the spectroscopic analysis control device 100 can be improved.

(6) Other Embodiments (a) In the above-described embodiment, the spectroscopic analysis control processing includes the accessory device information setting processing, but the present invention is not limited thereto. In cases where the accessory device is not used in the spectroscopic analysis device 300, it is not required that the spectroscopic analysis control processing includes the accessory device information setting processing. In this case, the accessory device screen A2 is not displayed in the setting screen display area A, and the step index B2 is not displayed in the step index display area B.

(b) In the above-described embodiment, the parameters are received by checking any one of the plurality of checkboxes displayed on the parameter setting screen or inputting numerical values in the numeric input field, but the present invention is not limited thereto. A pull-down menu may be displayed in the parameter setting screen and the parameters may be received by selecting one of the values in the pull-down menu.

(c) In the above-described embodiment, the step index corresponding to the step in which parameters have been set is displayed in a rectangular shape, and the step index corresponding to the step in which parameters have not been set is displayed in a ribbon-like shape, but the present invention is not limited thereto. The plurality of step indexes B1 to B5 may be displayed in any form as long as the step index corresponding to the step in which parameters have been set and the step index corresponding to the step in which parameters have not been set are distinguishable. When the step index corresponding to the step in which parameters have been set and the step index corresponding to the step in which parameters have not been set can be identified, a plurality of step indexes B1 to B5 may be displayed in the same shape.

(d) In the above-described embodiment, the step index corresponding to the parameter setting screen which is being displayed in the setting screen display area A is displayed in a color different from the colors of the other step indexes, but the present invention is not limited thereto. When the step index corresponding to the parameter setting screen which is being displayed in the setting screen display area A can be distinguished from the other step indexes, a plurality of step indexes B1 to B5 may be displayed in the same color.

(e) In the above-described embodiment, when any one of the plurality of step indexes B1 to B5 displayed on the display unit 160 is operated, an instruction to display the parameter setting screen corresponding to the operated step index is received, but the present invention is not limited thereto. When the operation buttons corresponding to the plurality of steps are separately provided, an instruction to display the parameter setting screen corresponding to the operated operation buttons may be received by operating the operation buttons.

The invention claimed is:

1. A spectroscopic analysis control device connected to a spectrophotometer for performing spectroscopic measurement of a sample and configured to quantify the sample based on parameters input from a display, the spectroscopic analysis control device comprising:
a CPU configured to sequentially display a plurality of parameter setting screens respectively corresponding to a plurality of steps successively executed in a predetermined order in a quantitation on the display and display a plurality of step indexes respectively corresponding to the plurality of steps on the display;
wherein the CPU is configured to receive inputting of a plurality of parameters respectively corresponding to the plurality of steps on the plurality of parameter setting screens;
wherein the CPU is configured to set the received parameters in an unchangeable manner each time a reception of inputting of the parameters in each parameter setting screen is completed;
wherein the CPU is configured to control the spectrophotometer based on the plurality of set parameters; and
wherein the CPU is configured to quantify the sample based on the plurality of set parameters,
wherein the CPU is configured to control the display so that a subsequent parameter setting screen is displayed each time parameters are set in one parameter setting screen and controls the display so that a step index corresponding to a parameter setting screen which is being displayed on the display among the plurality of step indexes is displayed in such a manner as to be distinguishable from the other step indexes.

2. The spectroscopic analysis control device as recited in claim 1,
wherein the CPU is configured to control the display to further distinguishably display a step index corresponding to a step in which parameters have been set and a step index corresponding to a step in which parameters have not been set.

3. The spectroscopic analysis control device as recited in claim 2,
wherein the CPU is configured to control the display unit so that the step index corresponding to the step in which parameters have been set and the step index corresponding to the step in which parameters have not been set are displayed in a different shape.

4. The spectroscopic analysis control device as recited in claim 1,
wherein the CPU is configured to switch displays between one or more parameter setting screens respectively corresponding to the one or more steps and a parameter setting screen subsequent to the one or more parameter setting screens after parameters corresponding to one or more steps have been set,
wherein the CPU is configured to control the display to display the parameter setting screen.

5. The spectroscopic analysis control device as recited in claim 4,
wherein the CPU is configured to control the display to display a parameter setting screen corresponding to the operated step index when any one of the plurality of step indexes displayed on the display is operated.

6. The spectroscopic analysis control device as recited in claim 1,
wherein the CPU is configured to reset the set parameters,
wherein the CPU is configured to cancel setting of parameters corresponding to all steps upon resetting the set parameters, and
wherein the CPU is configured to control the display to display a parameter setting screen upon resetting the set parameters.

7. The spectroscopic analysis control device as recited claim 1,
wherein the CPU is configured to set, as the plurality of parameters, measurement conditions of spectroscopic measurement in the spectrophotometer, parameters for generating a calibration curve indicating a correspondence relation between a concentration in a standard sample which is a sample having a known concentration and a spectral characteristic value, and a spectral characteristic value of an unknown sample which is a sample having an unknown concentration, in this order,
wherein the CPU is configured to control the spectrophotometer to measure spectral characteristic values of a standard sample and an unknown sample based on the set measurement conditions, and
wherein the CPU is configured to quantify a concentration of the unknown sample based on the set parameters for generating the calibration curve and the spectral characteristic value in the unknown sample.

8. The spectroscopic analysis control device as claimed in claim 7,
wherein the parameters for generating the calibration curve include the concentration of the standard sample, the spectral characteristic values of the standard sample, and an order of the calibration curve.

9. A spectroscopic analysis device comprising:
a spectrophotometer configured to perform spectroscopic measurement of a sample;
a display configured to receive inputting of parameters; and
the spectroscopic analysis control device as recited in claim 1 for controlling operations of the spectrophotometer and the display.

10. A spectroscopic analysis control method of a spectroscopic analysis control device connected to a spectrophotometer for performing spectroscopic measurement of a sample and configured to quantify the sample based on parameters input from a display, the spectroscopic analysis control method comprising:
sequentially displaying a plurality of parameter setting screens respectively corresponding to a plurality of steps sequentially executed in a predetermined order in a quantitation on the display and displaying a plurality of step indexes respectively corresponding to the plurality of steps on the display;
receiving inputting of a plurality of parameters respectively corresponding to the plurality of steps on the plurality of parameter setting screens;
setting the received parameters in an unchangeable manner each time a reception of inputting of parameters in each parameter setting screen is completed;
controlling the spectrophotometer based on the set parameters; and
quantifying the sample based on the plurality of set parameters,
wherein the step of sequentially displaying the plurality of parameter setting screens includes displaying a subsequent parameter setting screen on the display each time parameters are set in one display and displaying a step index corresponding to a parameter setting screen which is being displayed on the display among the plurality of step indexes on the display in such a manner as to be distinguishable from the other step indexes.

11. A non-transitory computer readable medium having stored therein a spectroscopic analysis control program of a spectroscopic analysis control device that is configured to control a spectrophotometer for performing spectroscopic measurement of a sample and configured to quantify the sample based on parameters input from a display, wherein when the spectroscopic analysis control device is configured with the spectroscopic analysis control program, the spectroscopic analysis control device is configured to execute:

processing of sequentially displaying a plurality of parameter setting screens respectively corresponding to a plurality of steps sequentially executed in a predetermined order in quantitation on the display and displaying a plurality of step indexes respectively corresponding to the plurality of steps on the display;

processing of receiving inputting of a plurality of parameters respectively corresponding to the plurality of steps in the plurality of parameter setting screens;

processing of setting the received parameters in an unchangeable manner each time a reception of inputting of parameters in each parameter setting screen is completed;

processing of controlling the spectrophotometer based on the set parameters; and processing of quantifying the sample based on the plurality of set parameters, wherein the processing of sequentially displaying a plurality of parameter setting screens includes displaying a subsequent parameter setting screen on the display each time parameters are set in parameter setting screen and displaying a step index corresponding to a parameter setting screen which is being displayed on the display among the plurality of step indexes on the display in such a manner as to be distinguishable from the other step indexes.

* * * * *